(12) United States Patent
Abuelezz

(10) Patent No.: US 12,137,040 B1
(45) Date of Patent: Nov. 5, 2024

(54) METHODS, SYSTEMS, APPARATUSES, AND DEVICES FOR FACILITATING MANAGING CONNECTIONS OF A NETWORK

(71) Applicant: Proxidize Ltd, London (GB)

(72) Inventor: Abdallah Abuelezz, Amman (JO)

(73) Assignee: Proxidize Ltd (GB)

( * ) Notice: Subject to any disclaimer, the term of this patent is extended or adjusted under 35 U.S.C. 154(b) by 0 days.

(21) Appl. No.: 18/625,213

(22) Filed: Apr. 3, 2024

Related U.S. Application Data

(60) Provisional application No. 63/459,645, filed on Apr. 16, 2023.

(51) Int. Cl.
| | | |
|---|---|---|
| G06Q 30/02 | (2023.01) | |
| G06Q 10/08 | (2024.01) | |
| G06Q 20/24 | (2012.01) | |
| G06Q 30/08 | (2012.01) | |
| G06Q 40/04 | (2012.01) | |
| H04L 41/0823 | (2022.01) | |
| H04L 41/5022 | (2022.01) | |
| H04L 67/1008 | (2022.01) | |

(52) U.S. Cl.
CPC ...... H04L 41/5022 (2013.01); H04L 41/0836 (2013.01); H04L 67/1008 (2013.01)

(58) Field of Classification Search
CPC ............. H04L 41/5022; H04L 41/0836; H04L 67/1008; G06Q 30/02; G06Q 30/08; G06Q 30/06; G06Q 10/08; G06Q 20/24; G06Q 40/04
USPC ........................................................ 709/226
See application file for complete search history.

(56) References Cited

U.S. PATENT DOCUMENTS

| | | | |
|---|---|---|---|
| 6,975,594 B1 | 12/2005 | Byers | |
| 7,287,275 B2 | 10/2007 | Moskowitz | |
| 7,962,376 B2* | 6/2011 | Smith | ................ G06Q 30/0601 |
| | | | 705/37 |
| 8,214,450 B2 | 7/2012 | Raciborski et al. | |
| 10,282,758 B1* | 5/2019 | Els | ..................... G06Q 30/0269 |

(Continued)

OTHER PUBLICATIONS

Costas Courcoubetis, An Auction Mechanism for Bandwidth Allocation Over Paths, Nov. 2001, DOI:10.1016/S1388-3437(01)80200-6, ResearchGate, https://www.researchgate.net/publication/2557233_An_Auction_Mechanism_for_Bandwidth_Allocation_Over_Paths.

(Continued)

*Primary Examiner* — Jude Jean Gilles
(74) *Attorney, Agent, or Firm* — Dhiraj Jindal; PATENT YOGI LLC

(57) ABSTRACT

A method for facilitating managing connections of a network includes receiving a bidding request comprising a first bid for a connection from a first user device, identifying at least one first bid bidden on the connection, obtaining an information, analyzing the information, determining an availability a capacity of a network device based on the analyzing of the information, analyzing the first bid and the at least one first bid, determining an outbidding of the at least one first user by the first user based on the analyzing of the first bid and the at least one first bid, determining an allowance for the connection for the first user based on the positive availability of the capacity and the determining of the outbidding, configuring the network device for providing the connection to the first user device based on the allowance, and storing the first bid.

20 Claims, 17 Drawing Sheets

(56) References Cited

U.S. PATENT DOCUMENTS

| | | | |
|---|---|---|---|
| 11,093,976 B2 | 8/2021 | Butler | |
| 2010/0274566 A1* | 10/2010 | Carlson | G06Q 30/0255 705/14.71 |
| 2010/0274567 A1* | 10/2010 | Carlson | G06Q 40/02 235/487 |
| 2010/0274598 A1* | 10/2010 | Carlson | G06Q 20/10 235/375 |
| 2010/0274626 A1* | 10/2010 | Carlson | G06Q 20/12 705/14.58 |
| 2010/0274652 A1* | 10/2010 | Carlson | G06Q 30/0251 705/14.26 |

OTHER PUBLICATIONS

Bo-Ruei Kao, Nguyen Ngoc Tu, I.-Shyan Hwang & K. Robert Lai, Auction-Based Bandwidth Allocation in Multi-Hop Wireless Ad Hoc Networks, Sep. 20, 2012, vol. 71, pp. 929-945, (2013), Springer Link, https://link.springer.com/article/10.1007/s11277-012-0852-7.
Nir Vulkan and Chris Preist, Automated Trading in Agent-Based Markets for Communication Bandwidth, vol. 7, No. 4 (Summer, 2003), pp. 119-150 (32 pages), JSTOR, https://www.jstor.org/stable/27751080.

\* cited by examiner

METHODS, SYSTEMS, APPARATUSES, AND DEVICES FOR FACILITATING MANAGING CONNECTIONS OF A NETWORK

REFERENCE TO RELATED APPLICATIONS

This application claims the benefit of U.S. Provisional Patent Application No. 63/459,645, titled "METHODS AND SYSTEMS FOR FACILITATING AUTOMATED REAL-TIME BIDDING ON BANDWIDTH FOR A PLURALITY OF PURPOSES", filed 16 Apr. 2023, which is incorporated by reference herein in its entirety.

FIELD OF THE INVENTION

Generally, the present disclosure relates to the field of data processing. More specifically, the present disclosure relates to methods, systems, apparatuses, and devices for facilitating managing connections of a network.

BACKGROUND OF THE INVENTION

The field of data processing is technologically important to several industries, business organizations, and/or individuals.

Existing techniques for facilitating managing connections of a network are deficient with regard to several aspects. For instance, current technologies do not optimize the network to fulfill the needs of users with different requirements and budgets. Furthermore, current technologies do not allow for personalization of the network to provide users with connections tailored to their specific desired characteristics. Moreover, current technologies do not optimize network usage by allocating all of available capacity of the network.

Therefore, there is a need for improved methods, systems, apparatuses, and devices for facilitating managing connections of a network that may overcome one or more of the above-mentioned problems and/or limitations.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed herein is a method for facilitating managing connections of a network, in accordance with some embodiments. Accordingly, the method may include a step of receiving, using a communication device, a bidding request from a first user device associated with a first user. Further, the bidding request may include a first bid comprising a first price per data unit for bidding on a connection. Further, the method may include a step of identifying, using a processing device, at least one first bid comprising at least one first price per data unit bidden on the connection based on the bidding request. Further, the method may include a step of obtaining, using the processing device, at least one information associated with at least one network device of the network used for providing the connection based on the bidding request. Further, the method may include a step of analyzing, using the processing device, the at least one information. Further, the method may include a step of determining, using the processing device, an availability of a capacity of the at least one network device for allowing the first user device to consume data unit using the connection based on the analyzing of the at least one information. Further, the availability may include a positive availability and a negative availability. Further, the method may include a step of analyzing, using the processing device, the first bid and the at least one first bid. Further, the method may include a step of determining, using the processing device, an outbidding of the at least one first user by the first user based on the analyzing of the first bid and the at least one first bid. Further, the method may include a step of determining, using the processing device, an allowance for the connection for the first user based on the positive availability of the capacity and the determining of the outbidding. Further, the method may include a step of configuring, using the processing device, the at least one network device for providing the connection to the first user device based on the allowance. Further, the method may include a step of storing, using a storage device, the first bid.

Further disclosed herein is a system for facilitating managing connections of a network, in accordance with some embodiments. Accordingly, the system may include a communication device configured for receiving a bidding request from a first user device associated with a first user. Further, the bidding request may include a first bid comprising a first price per data unit for bidding on a connection. Further, the system may include a processing device. Further, the processing device may be communicatively coupled with the communication device. Further, the processing device may be configured for identifying at least one first bid comprising at least one first price per data unit bidden on the connection based on the bidding request. Further, the processing device may be configured for obtaining at least one information associated with at least one network device of the network used for providing the connection based on the bidding request. Further, the processing device may be configured for analyzing the at least one information. Further, the processing device may be configured for determining an availability of a capacity of the at least one network device for allowing the first user device to consume data unit using the connection based on the analyzing of the at least one information. Further, the availability may include a positive availability and a negative availability. Further, the processing device may be configured for analyzing the first bid and the at least one first bid. Further, the processing device may be configured for determining an outbidding of the at least one first user by the first user based on the analyzing of the first bid and the at least one first bid. Further, the processing device may be configured for determining an allowance for the connection for the first user based on the positive availability of the capacity and the determining of the outbidding. Further, the processing device may be configured for configuring the at least one network device for providing the connection to the first user device based on the allowance. Further, the system may include a storage device. Further, the storage device may be communicatively coupled with the processing device. Further, the storage device may be configured for storing the first bid.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
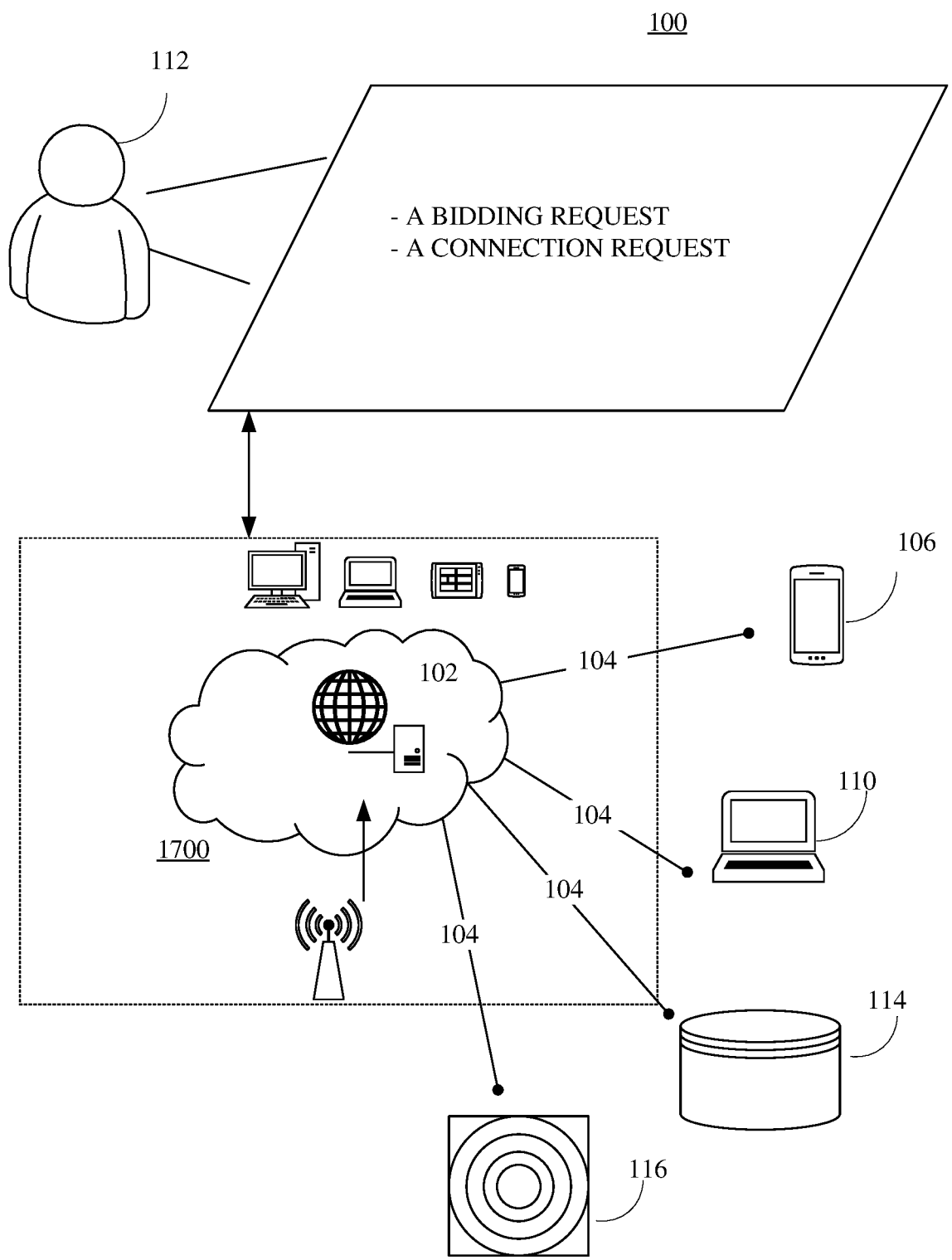
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating managing connections of a network, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating managing connections of a network. Further, the managing of the connections optimizes a performance of the network, balances a load of the network, reduces a congestion in the network, optimizes a usage of the network, etc.

Further, the present disclosure describes methods and systems for facilitating automated real-time bidding on bandwidth for a plurality of purposes. Further, the plurality of purposes may include managing connections of the network, managing capacity allocation of the network, managing bandwidth allocation, personalizing the connections of the network, etc. Further, the disclosed system may be configured for real-time automated bidding by participants on network bandwidth based on the collective characteristics of the network devices such as speed, location, Internet service provider (ISP), Autonomous System Number (ASN), internet protocol (IP) subnet, and so on. Further, users (or proxy users) often have different needs and different budgets. The disclosed system allows the users or participants to pay only for the specific characteristics the users desire and allows for less desirable bandwidth to be allocated/sold for less automatically, without requiring any human intervention. Further, the system may develop a proxidize proxy network. Further, the system may include bandwidth broker servers, bandwidth selling devices (such as USB modems, phones, laptops, IoT devices, virtual servers, cloud servers, etc.), and bandwidth buyer's devices. When a new bandwidth-selling device attempts to join the Proxidize proxy network, the bandwidth broker server may collect important attributes, those being: speed, location, ASN, ISP, and IP subnet of the bandwidth-selling device. The bandwidth broker server may then group each of the attributes into groups such as: "Devices with more than 100 Mbps speed", "Devices running on Verizon ISP", "Devices running on AS0000 ASN", etc.

Further, bandwidth buyers may set which attributes the bandwidth buyers wish their proxies to have and pay for a balance top-up on their account. For instance, a buyer might only want to have access to proxies on devices running on the group "Devices with more than 100 Mbps speed". Then the buyer may set a bidding amount for how much the buyer wishes to pay per 1 MB/10 MB/100 MB/1 GB of bandwidth the buyer consumes via the proxies. In this instance, the buyer set the amount at $0.01/MB. The bandwidth broker may then compare the bid of the buyer in real time to all the other bids that exist on the same group of devices to see if the group has the capacity to allow the buyer to connect to it and if the bid of the buyer matches or is higher than what other bidders bid. If there is not enough capacity, the buyer may only be allowed to connect to the group if the buyer's bid is higher than what the lowest bidder on the group has bid. In this case, the lowest bidder may be exited from the group once the lowest bidder consumed the data the lowest bidder had paid for and the buyer may be allowed to connect. This process may be repeated in real-time whenever the buyer consumes the amount of data the buyer initially paid for (1 MB/10 MB/100 MB/1 GB) via the proxy connection provided to the buyer.

Further, the network devices (or Bandwidth selling devices) may be members of multiple groups depending on available capacity measured by the usage of the available throughput on the devices, with all the capacity being allocated towards the highest bidding group, except in the case of the bidders not consuming all the capacity of the device. Further, the network devices may be any network connected device. Further, in an instance, the network devices may include USB modems, phones, laptops, IoT devices, virtual servers, cloud servers, etc.

Once a user bids for a specific amount of data/bandwidth, the user may be shielded from price threshold fluctuation. So if the user bids $10 for 1 GB. The user may have uninterrupted access to that amount of data on the group the user has bid for disregarding how the price of data/bandwidth for this group might fluctuate.

The real-time bidding may be repeated by the bandwidth broker servers once the user or member consumes 90% of their won/allocated bandwidth or within 60 seconds of running out of bandwidth based on their historic usage, whichever comes first, provided the user has enough balance in an account of the user. If no balance is left, a connection of the user to the proxy may be halted.

Further, in-demand network devices and their prospective traffic may receive the most optimal optimization. Further, the disclosed system may allow the users to pay for attributes the users care about and provide value to them. Further, the disclosed system may be fairer towards buyers and sellers.

Further, in some embodiments, the buyer also has the ability to bid on unlimited access to a shared port on a specific device or a shared port on the entire network or exclusive access to a device. For instance, a first buyer A may have the option to either pay for the GBs he is using on unlimited ports, or the first user may get unlimited access to a shared port or unlimited access to an exclusive device where the first buyer is the only buyer allowed to use this device.

Further, the disclosed system may be configured for grouping based on locations. Further, the buyers may choose to whitelist or blacklist specific locations based on the country, state, county, zip code, or city. Further, the grouping may be based on cellular characteristics of the devices. Further, for devices using cellular connectivity, the buyer may choose to bid on devices with a specific cellular network and network-fetching capabilities such as Cellular Frequency or Bands, PLMN, RSSI, RSRP, SINR, and other mobile-specific characteristics. Further, the grouping may be based on a number of IPs. Further, some commercial devices may have multiple IPv4 or IPv6 IP addresses associated with them. So a user bidding on exclusive access to a device may also decide to only bid on devices with at least 2 IPs or more, at least 1 IPV4 and 1 IPv6 IPs or more, etc. Further, the grouping may be based on the age of the IP. The age of the IP may be determined from an instance when the IP was first seen on the network. For example, some users may choose to bid for only new IPs, or only IPs that have been on the network for less than a week, etc. Further, the disclosed system may utilize a distributed ledger to maintain a record of the bandwidth sold and bought bandwidth and a real-time record of all the devices and their characteristics. Further, the disclosed system may use machine learning. Further, the disclosed system may be based on a Real-Time Pricing Engine (RTPE) that may continuously use historical data to optimize a real-time floor pricing using the following sequence:

i. Real-Time Pricing Engine (RTPE) may continuously track what are the most & least in-demand characteristics or groups.
ii. The RTPE may then continuously modify the pricing floor to ensure the highest amount of bandwidth is sold while maintaining the most optimized pricing.
iii. Exact Method:

Further, the RTPE may be configured to fetch the latest purchasing history data from the public ledger or the Bandwidth Broker (BB). Further, the RTPE may look (or analyze) the data to find what specific characteristics brought the highest price and what characteristics brought the lowest price.

Further, the RTPE may then marginally increase the price of the group that has the characteristic that brings the highest price and marginally lower the price of the group that contains the characteristic that brings the lowest price. Further, the RTPE may record the changes in buying behavior to look for noticeable changes. If positive changes are detected, such as an increase in revenue per priced item (bandwidth, port, or device), the RTPE may record the activity as positive feedback in a machine learning model. Further, if the monetization is decreased, the RTPE may record the activity as negative feedback. Further, the RTPE may constantly repeat this learning process.

FIG. 1 is an illustration of an online platform 100 consistent with various embodiments of the present disclosure. By way of non-limiting example, the online platform 100 for facilitating managing connections of a network may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1700.

Figure 2:
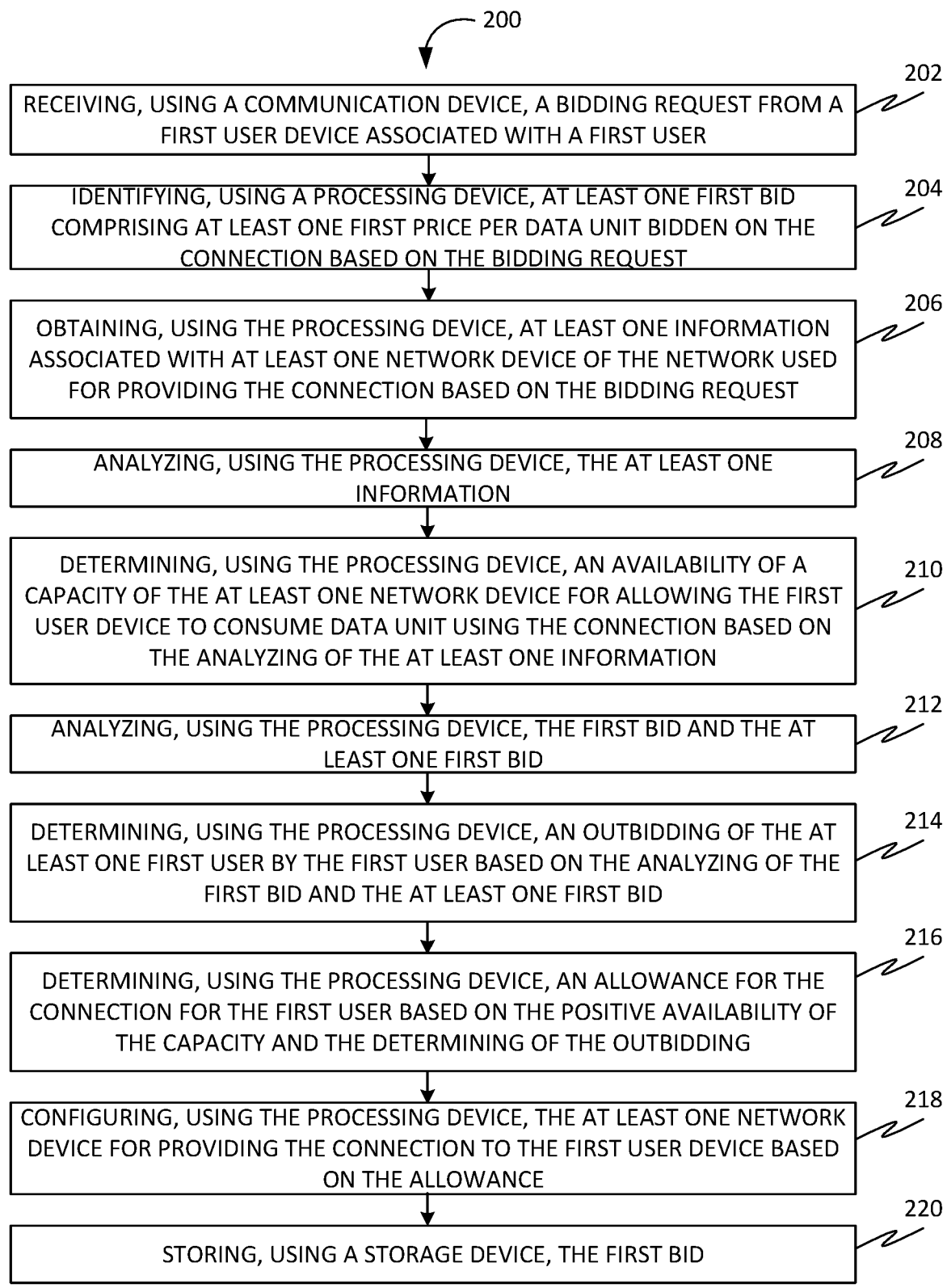
FIG. 2 is a flowchart of a method 200 for facilitating managing connections of a network, in accordance with some embodiments.

FIG. 2 is a flowchart of a method 200 for facilitating managing connections of a network, in accordance with some embodiments. Accordingly, at 202, the method 200 may include receiving, using a communication device, a bidding request from a first user device associated with a first user. Further, the bidding request may include a first bid. Further, the first bid may include a first price per data unit for bidding on a connection. Further, the first bid may include at least one amount data unit requested by the first user. Further, the first user device may include a smartphone, a laptop, a desktop, a server, a tablet, a smartwatch, etc. Further, the first user device may include a client device, a bandwidth buyer device, etc. Further, the first user may include an individual, an institution, an organization, etc. Further, the first user may include a bandwidth buyer, a client, etc. Further, the data unit may include 1 Megabyte (MB), 10 MB, 100 MB, 1 Gigabyte (GB), etc. Further, the connection may include a connection link, a communication link, a bandwidth, etc.

Further, at 204, the method 200 may include identifying, using a processing device, at least one first bid comprising at least one first price per data unit bidden on the connection by at least one first user based on the bidding request.

Further, at 206, the method 200 may include obtaining, using the processing device, at least one information associated with at least one network device of the network used for providing the connection based on the bidding request. Further, the at least one information may include bandwidth, traffic, latency, etc. Further, the at least one network device may include a network connected device. Further, the at least one network device may include a modem (USB modem), a smartphone, a laptop, an IoT device, a virtual server, a cloud server, etc. Further, the at least one network device may include a bandwidth seller device. Further, the network may include a proxy network, a Proxidize proxy network, etc. Further, the connection may include a proxy connection. Further, the obtaining of the at least one information may include obtaining the at least one information associated with the at least one network device from at least one of the at least one network device, at least one gateway, at least one router, at least one switch, etc. Further, the network may include the at least one gateway, the at least one router, the at least one switch, etc. Further, the obtaining of the at least one information may include obtaining the at least one information associated with the at least one network device from at least one sensor. Further, the at least one sensor may be configured for monitoring the at least one network device of the network.

Further, at 208, the method 200 may include analyzing, using the processing device, the at least one information.

Further, at 210, the method 200 may include determining, using the processing device, an availability of a capacity of the at least one network device for allowing the first user device to consume data unit using the connection based on the analyzing of the at least one information. Further, the availability may include a positive availability and a negative availability.

Further, at 212, the method 200 may include analyzing, using the processing device, the first bid and the at least one first bid. Further, the analyzing of the first bit and the at least one first bid may include comparing the first bid and the at least one first bid in real time.

Further, at 214, the method 200 may include determining, using the processing device, an outbidding of the at least one first user by the first user based on the analyzing of the first bid and the at least one first bid.

Further, at 216, the method 200 may include determining, using the processing device, an allowance for the connection for the first user based on the positive availability of the capacity and the determining of the outbidding. Further, the allowance may include providing access for connection.

Further, at 218, the method 200 may include configuring, using the processing device, the at least one network device for providing the connection to the first user device based on the allowance. Further, the configuring of the at least one network device may include adjusting, modifying, changing, etc., a setting, a parameter, etc., of the at least one network device. Further, the configuring of the at least one network device may include configuring a network interface of the at least one network device, allocating one or more portions of a bandwidth of the at least one network device, configuring a location, assigning IP addresses, configuring a network topology of the at least one network device, etc. Further, the network topology may include a physical connection, a logical link, a routing path, etc. Further, the at least one network device collectively provides the connection to the first user device based on the configuring. Further, the configuring of the at least one network device optimizes a usage of the network, balances a load on the network, optimizes a performance of the network, etc.

Further, at 220, the method 200 may include storing, using a storage device, the first bid. Further, the storing of the first bid may include storing the first bid in a distributed ledger associated with a blockchain network.

Figure 3:
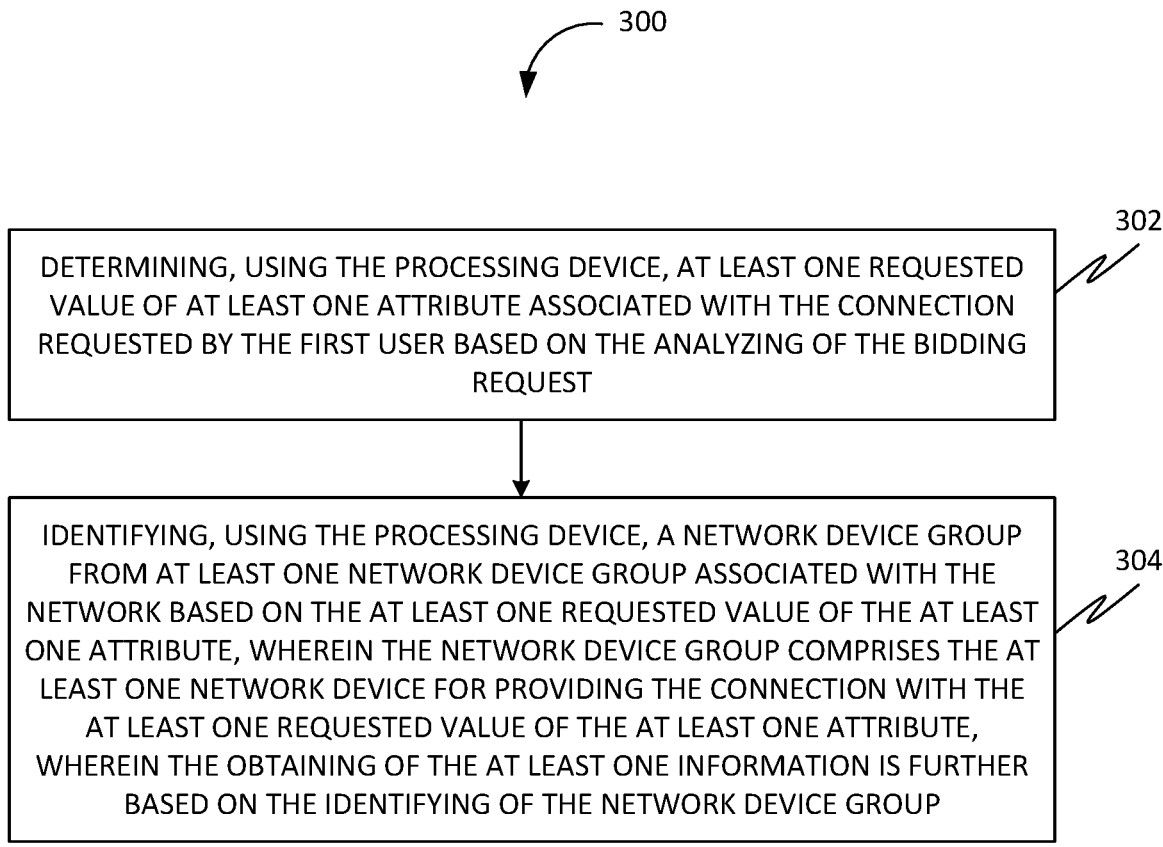
FIG. 3 is a flowchart of a method 300 for facilitating the managing of the connections of the network, in accordance with some embodiments.

FIG. 3 is a flowchart of a method 300 for facilitating the managing of the connections of the network, in accordance with some embodiments. Accordingly, at 302, the method 300 may include determining, using the processing device, at least one requested value of at least one attribute associated with the connection requested by the first user based on the analyzing of the bidding request. Further, the at least one requested value may be associated with quantification of the at least one attribute. Further, the at least one attribute may include speed, latency, bandwidth, reliability, location, internet service provider (ISP), internet protocol (IP) subnet, type of IP address, number of IP addresses, age of IP address, connection type (such as a wired connection, a wireless connection, a virtual private network (VPN) connection, etc.), connection interface, etc. Further, the at least one requested value at least one of qualitatively and quantitatively quantifies the at least one attribute.

Further, at 304, the method 300 may include identifying, using the processing device, a network device group from at least one network device group associated with the network based on the at least one requested value of the at least one attribute. Further, the network device group may include the at least one network device for providing the connection associated with the at least one requested value of the at least one attribute. Further, the obtaining of the at least one information may be based on the identifying of the network device group. Further, the at least one network group may include "Devices with more than 100 Mbps speed", "Devices running on Verizon ISP", "Devices running on AS0000 ASN", etc.

Figure 4:
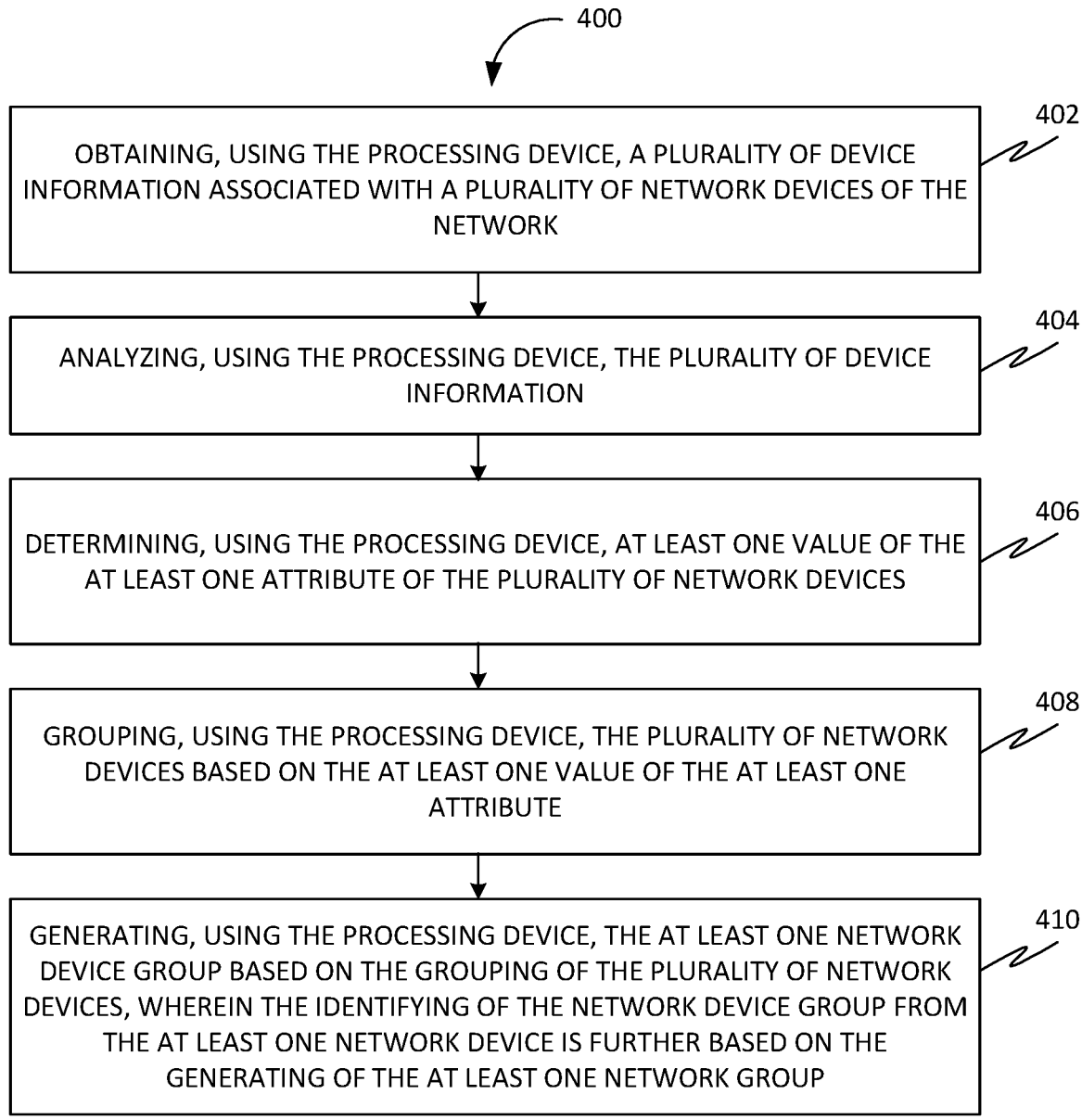
FIG. 4 is a flowchart of a method 400 for facilitating the managing of the connections of the network, in accordance with some embodiments.

FIG. 4 is a flowchart of a method 400 for facilitating the managing of the connections of the network, in accordance with some embodiments. Accordingly, at 402, the method 400 may include obtaining, using the processing device, a plurality of device information associated with a plurality of network devices of the network. Further, the plurality of device information may include bandwidth information, speed information, capacity information, latency information, traffic information, ISP information, ASN information, IP subnet information, throughput information, communication channel information, network information, connectivity information, location information, IP address type, IP address numbers, IP addresses age, etc.

Further, at 404, the method 400 may include analyzing, using the processing device, the plurality of device information.

Further, at 406, the method 400 may include determining, using the processing device, at least one value of the at least one attribute associated with the plurality of network devices based on the analyzing of the plurality of device information. Further, the at least one value at least one of qualitatively and quantitatively quantifies the at least one attribute. Further, the at least one attribute may include bandwidth, speed, location, IP subnet, ASN, etc.

Further, at 408, the method 400 may include grouping, using the processing device, the plurality of network devices based on the at least one value of the at least one attribute. Further, the grouping may include organizing the plurality of network devices into groups based on the at least one value of the at least one attribute.

Further, at 410, the method 400 may include generating, using the processing device, the at least one network device group based on the grouping of the plurality of network devices. Further, the at least one network device collectively provides at least one connection with at least one first value of the at least one attribute. Further, the identifying of the network device group from the at least one network device may be based on the generating of the at least one network group.

Figure 5:
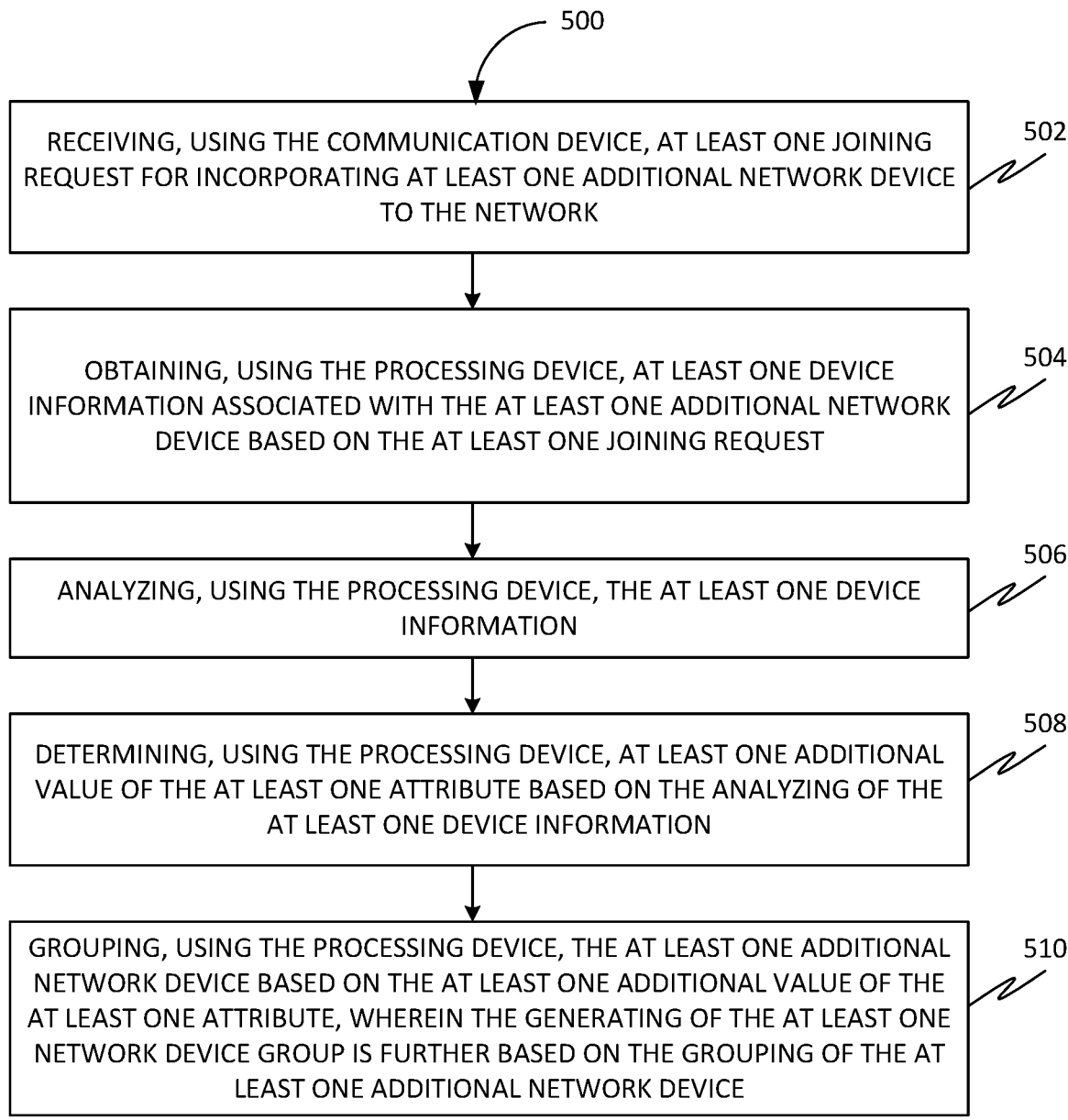
FIG. 5 is a flowchart of a method 500 for facilitating the managing of the connections of the network, in accordance with some embodiments.

FIG. 5 is a flowchart of a method 500 for facilitating the managing of the connections of the network, in accordance with some embodiments. Accordingly, at 502 the method 500 may include receiving, using the communication device, at least one joining request for incorporating at least one additional network device to the network. Further, the at least one additional network device may include a modem (USB modem), a smartphone, a laptop, an IoT device, a virtual server, a cloud server, etc.

Further, at 504, the method 500 may include obtaining, using the processing device, at least one device information associated with the at least one additional network device based on the at least one joining request. Further, the at least one device information may include bandwidth information, speed information, capacity information, latency information, traffic information, ISP information, ASN information, IP subnet information, throughput information, communication channel information, network information, connectivity information, location information, IP address type, IP address numbers, IP addresses age, etc.

Further, at 506, the method 500 may include analyzing, using the processing device, the at least one device information.

Further, at 508, the method 500 may include determining, using the processing device, at least one additional value of the at least one attribute based on the analyzing of the at least one device information. Further, the at least one additional value may at least one of qualitatively and quantitatively quantifies the at least one parameter.

Further, at 510, the method 500 may include grouping, using the processing device, the at least one additional network device based on the at least one additional value of the at least one attribute. Further, the generating of the at least one network device group may be based on the grouping of the at least one additional network device.

Figure 6:
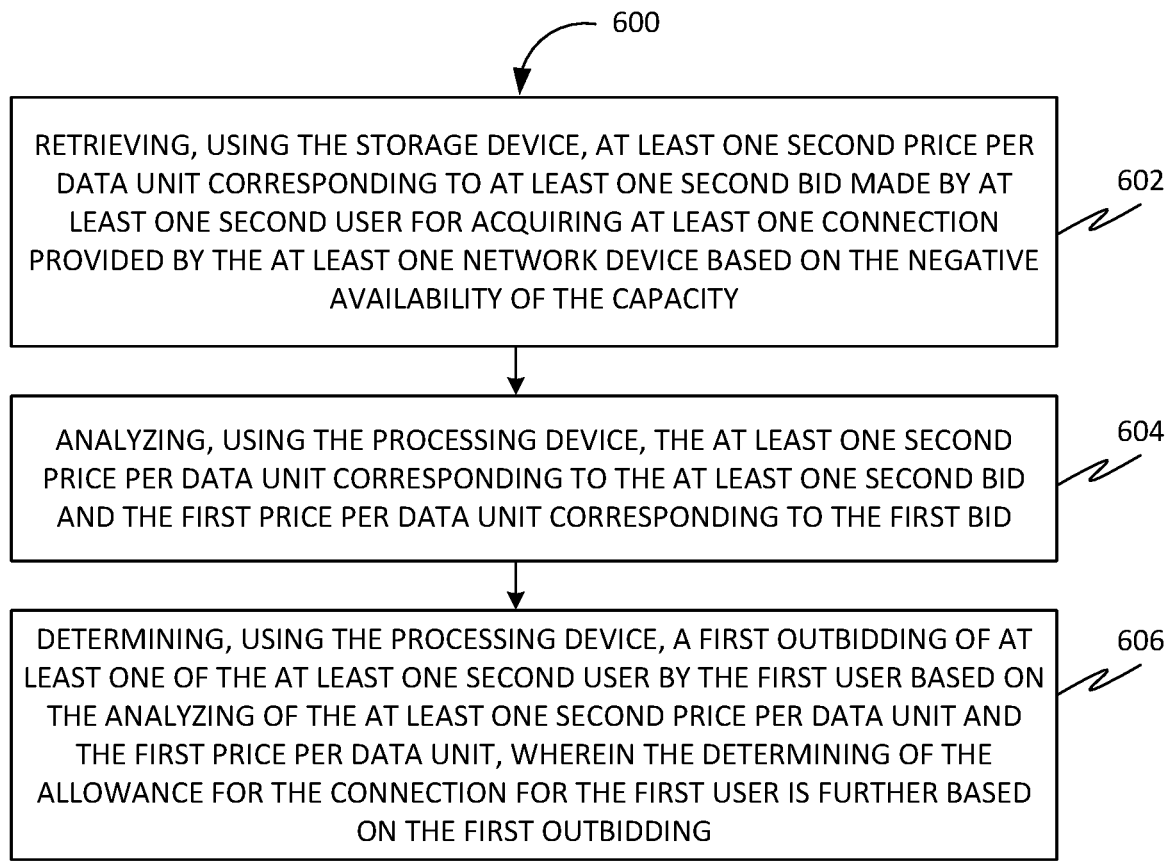
FIG. 6 is a flowchart of a method 600 for facilitating the managing of the connections of the network, in accordance with some embodiments.

FIG. 6 is a flowchart of a method 600 for facilitating the managing of the connections of the network, in accordance with some embodiments. Accordingly, at 602, the method 600 may include retrieving, using the storage device, at least one second price per data unit corresponding to at least one second bid made by at least one second user for acquiring at least one connection provided by the at least one network device based on the negative availability of the capacity. Further, the retrieving of the at least one second price per data unit may include retrieving the at least one second price per data unit corresponding to the at least one second bid made by the at least one second user from at least one second distributed ledger associated with the at least one blockchain network.

Further, at 604, the method 600 may include analyzing, using the processing device, the at least one second bid and the first bid. Further, the analyzing of the at least one second bid may include comparing the at least one second bid with the first bid.

Further, at 606, the method 600 may include determining, using the processing device, a first outbidding of at least one of the at least one second user by the first user based on the analyzing of the at least one second bid and the first bid. Further, the determining of the allowance for the connection for the first user may be based on the first outbidding.

Figure 7:
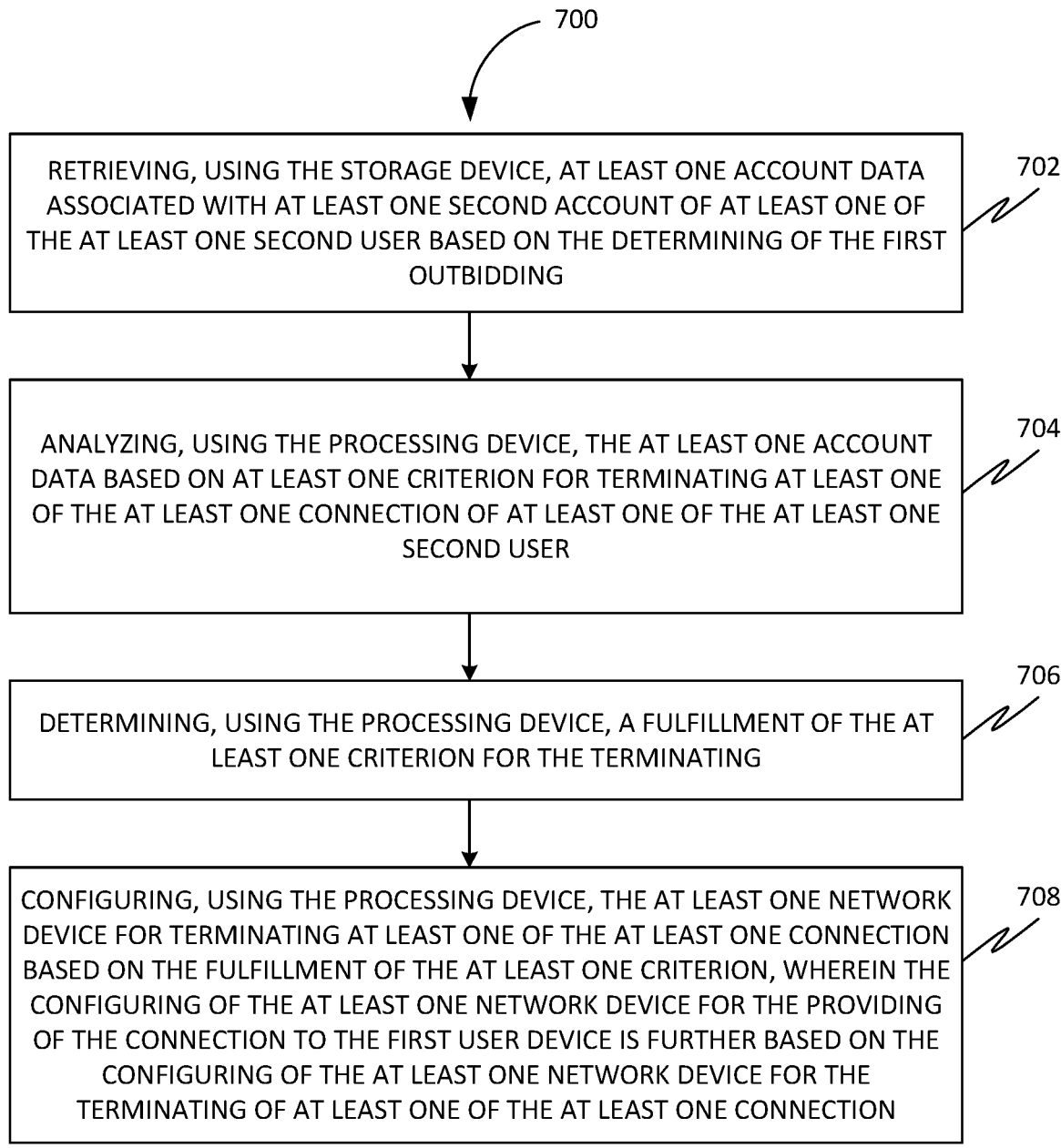
FIG. 7 is a flowchart of a method 700 for facilitating the managing of the connections of the network, in accordance with some embodiments.

FIG. 7 is a flowchart of a method 700 for facilitating the managing of the connections of the network, in accordance with some embodiments. Accordingly, at 702, the method 700 may include retrieving, using the storage device, at least one account data associated with at least one second account of at least one of the at least one second user based on the determining of the first outbidding. Further, the at least one account data may include at least one amount remaining in the at least one second account of the at least one second user. Further, the at least one amount decreases based on a usage of data unit through the at least one connection provided to at least one second user device associated with the at least one second user and the at least one second price per data unit bid by the at least one second user. Further, the retrieving of the at least one account data may include retrieving the at least one account data associated with the at least one second account at least one of the at least one second user at least one second distributed ledger associated with the at least one blockchain network.

Further, at 704, the method 700 may include analyzing, using the processing device, the at least one account data based on at least one criterion for terminating at least one of the at least one connection of at least one of the at least one second user. Further, the at least one criterion may include a complete consumption of at least one allocated amount of data unit to at least one of the at least one second user.

Further, at 706, the method 700 may include determining, using the processing device, a fulfillment of the at least one criterion for the terminating based on the analyzing of the at least one account data.

Further, at 708, the method 700 may include configuring, using the processing device, the at least one network device for terminating at least one of the at least one connection based on the fulfillment of the at least one criterion. Further, the configuring of the at least one network device for the providing of the connection to the first user device may be based on the configuring of the at least one network device for the terminating of at least one of the at least one connection.

Figure 8:
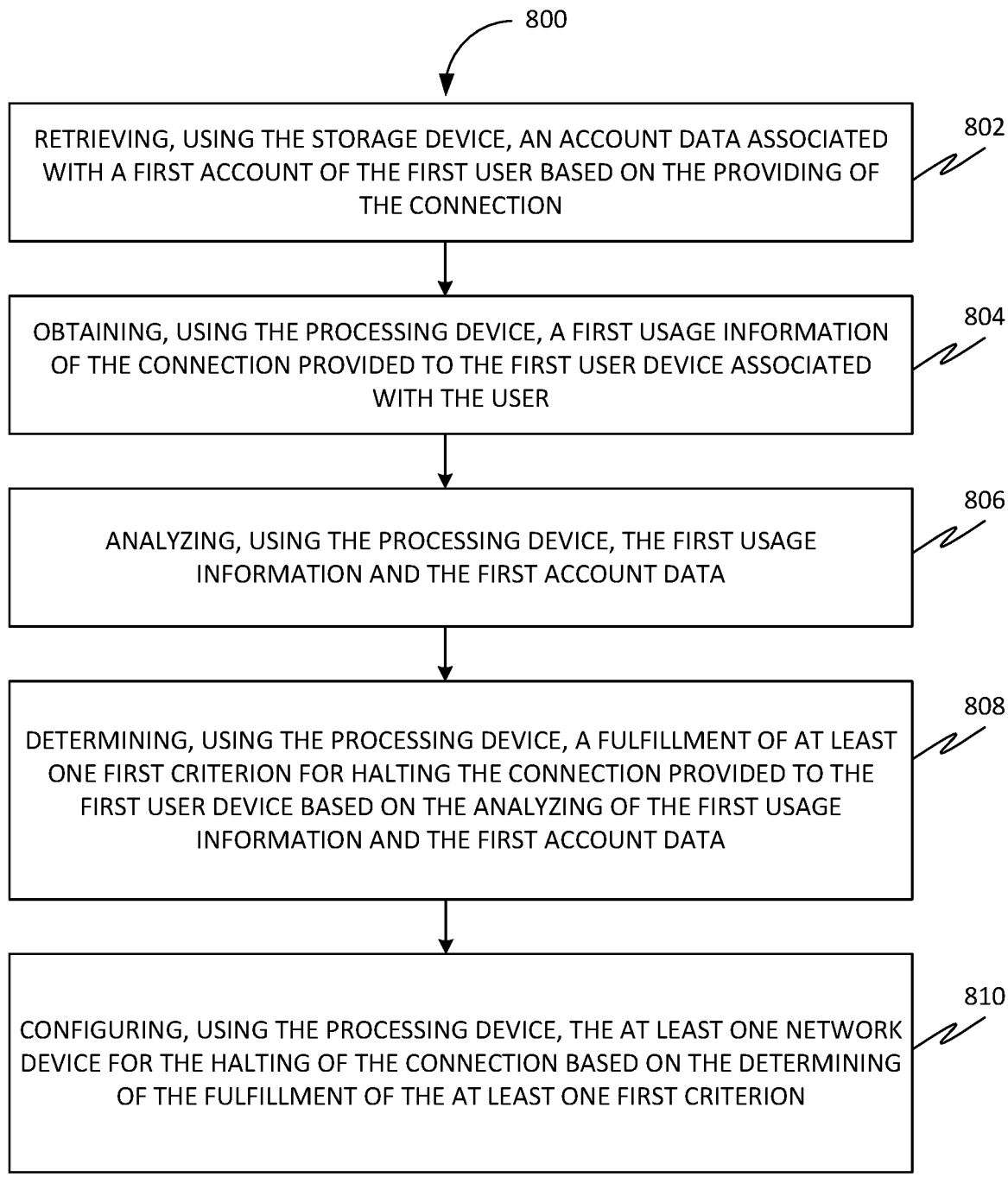
FIG. 8 is a flowchart of a method 800 for facilitating the managing of the connections of the network, in accordance with some embodiments.

FIG. 8 is a flowchart of a method 800 for facilitating the managing of the connections of the network, in accordance with some embodiments. Accordingly, at 802, the method 800 may include retrieving, using the storage device, an account data associated with a first account of the first user based on the providing of the connection. Further, the account data may include at least one amount of data unit allocated to the first user.

Further, at 804, the method 800 may include obtaining, using the processing device, a first usage information of the connection provided to the first user device associated with the user. Further, the first usage information may include an amount of data unit consumed by the first account.

Further, at 806, the method 800 may include analyzing, using the processing device, the first usage information and the first account data.

Further, at 808, the method 800 may include determining, using the processing device, a fulfillment of at least one first criterion for halting the connection provided to the first user device based on the analyzing of the first usage information and the first account data. Further, the at least one first criterion may include a complete consumption of at least one allocated amount of data unit to the first user.

Further, at 810, the method 800 may include configuring, using the processing device, the at least one network device for the halting of the connection based on the determining of the fulfillment of the at least one first criterion.

Figure 9:
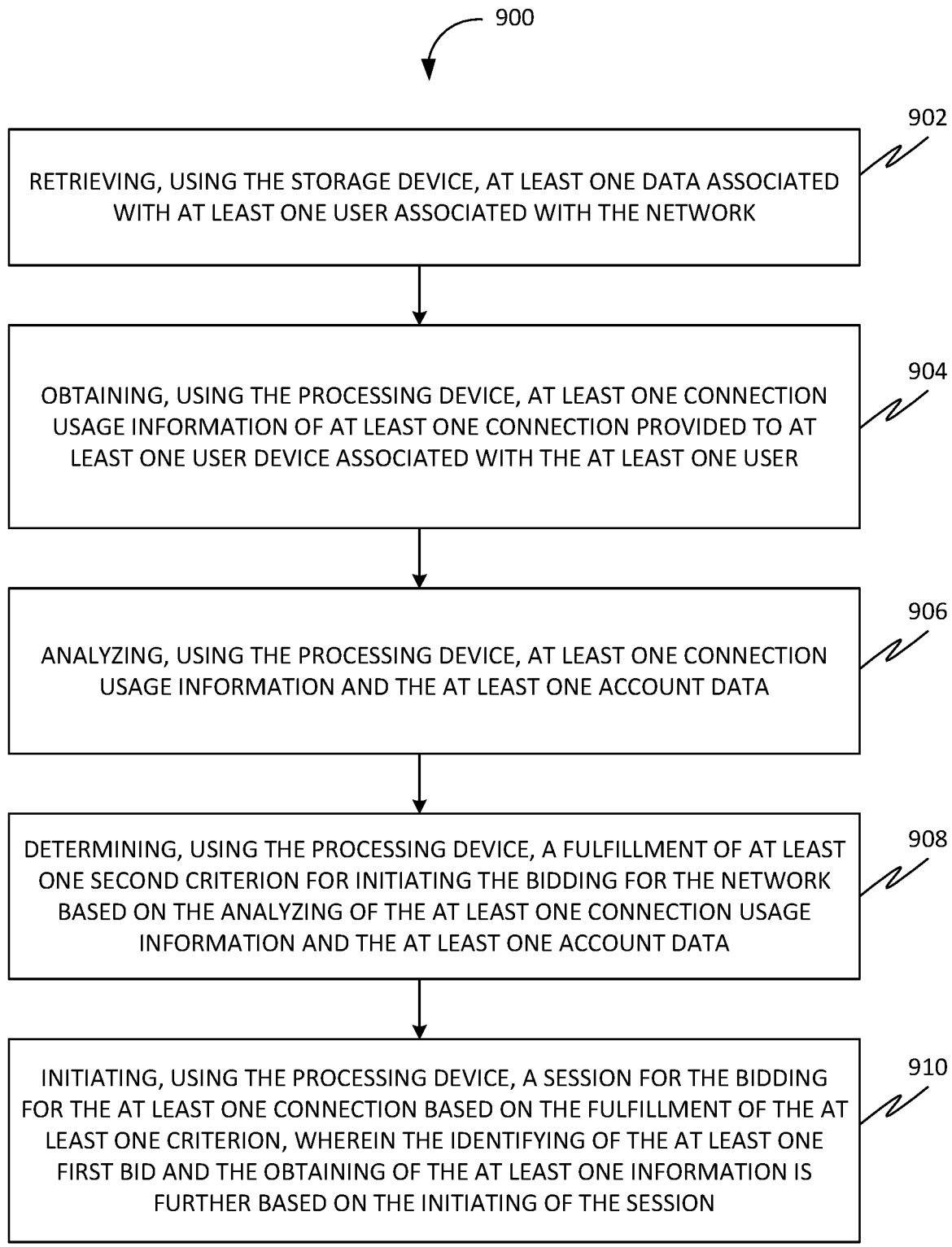
FIG. 9 is a flowchart of a method 900 for facilitating the managing of the connections of the network, in accordance with some embodiments.

FIG. 9 is a flowchart of a method 900 for facilitating the managing of the connections of the network, in accordance with some embodiments. Accordingly, at 902, the method 900 may include retrieving, using the storage device, at least one data associated with at least one user associated with the network. Further, the at least one data may include at least one allocated amount of data unit allocated to the at least one user.

Further, at 904, the method 900 may include obtaining, using the processing device, at least one connection usage information of at least one connection provided to at least one user device associated with the at least one user. Further, the at least one connection usage information may include at least one consumed amount of data unit used by the at least one user through the at least one connection.

Further, at 906, the method 900 may include analyzing, using the processing device, at least one connection usage information, and the at least one account data.

Further, at 908, the method 900 may include determining, using the processing device, a fulfillment of at least one second criterion for initiating the bidding for the network based on the analyzing of the at least one connection usage information and the at least one account data. Further, the at least one second criterion may include a consumption of 90% of the at least one allocated amount unit of data, a running out of the at least one allocated amount of data unit within at least one time period (60 seconds), etc.

Further, at 910, the method 900 may include initiating, using the processing device, a session for the bidding for the at least one connection based on the fulfillment of the at least one criterion. Further, the identifying of the at least one first bid and the obtaining of the at least one information may be based on the initiation of the session.

Figure 10:
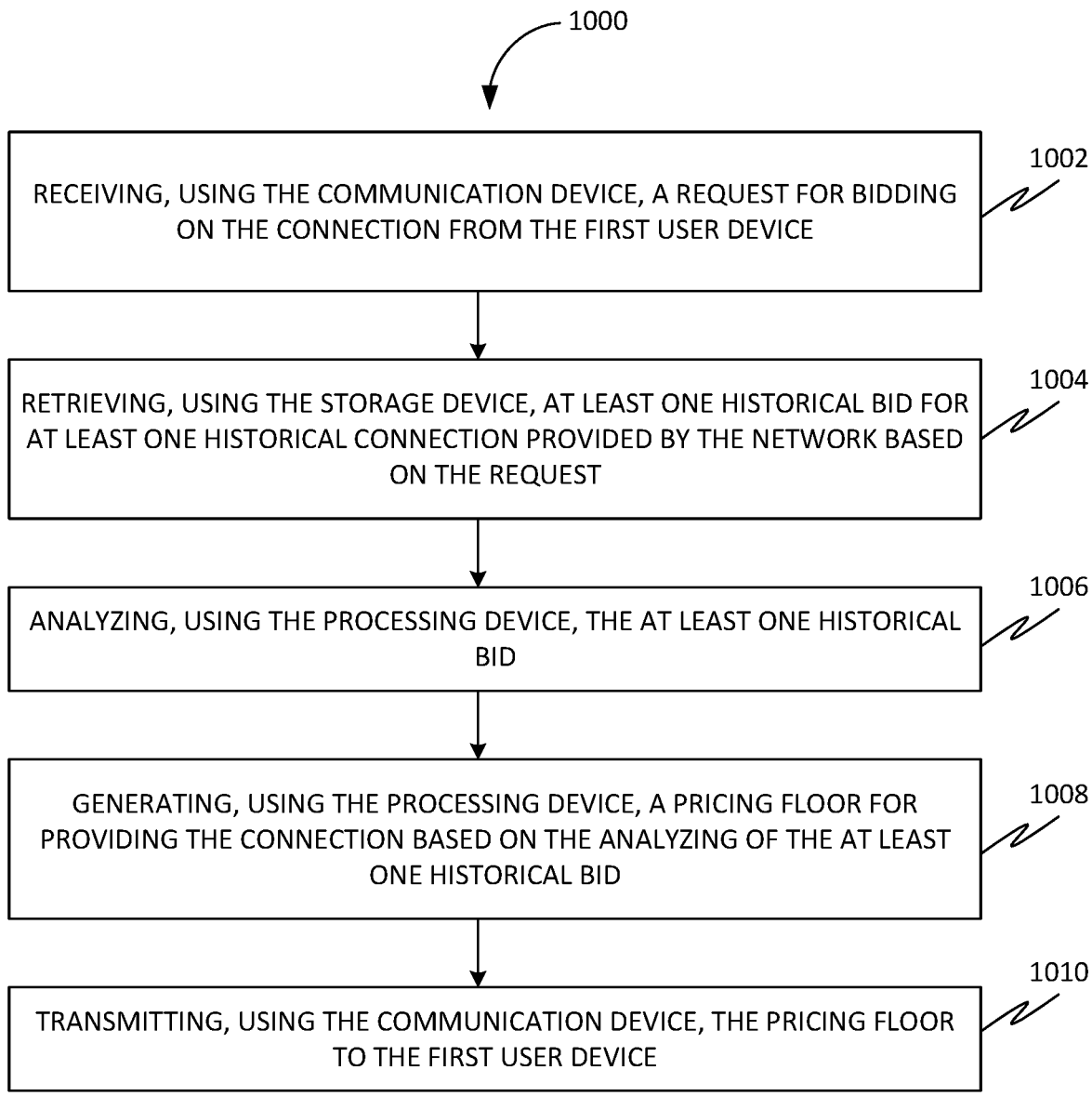
FIG. 10 is a flowchart of a method 1000 for facilitating the managing of the connections of the network, in accordance with some embodiments.

FIG. 10 is a flowchart of a method 1000 for facilitating the managing of the connections of the network, in accordance with some embodiments. Accordingly, at 1002 the method 1000 may include receiving, using the communication device, a request for bidding on the connection from the first user device.

Further, at 1004, the method 1000 may include retrieving, using the storage device, at least one historical bid for at least one historical connection provided by the network based on the request. Further, the at least one historical bid may include at least one historical price paid per data unit.

Further, at 1006, the method 1000 may include analyzing, using the processing device, the at least one historical bid.

Further, at 1008, the method 1000 may include generating, using the processing device, a pricing floor for providing the connection based on the analyzing of the at least one historical bid. Further, the pricing floor may include the at least one price paid for per data unit.

Further, at 1010, the method 1000 may include transmitting, using the communication device, the pricing floor to the first user device.

Further, in an embodiment, the analyzing of the at least one historical bid may include analyzing the at least one historical bid using a Real-Time Pricing Engine (RTPE). Further, the RTPE may be configured for tracking a demand of at least one historical value of at least one attribute of the at least one historical connection. Further, the RTPE may be configured for modifying at least one historical pricing floor of the at least one historical connection based on the demand. Further, the generating of the pricing floor may be based on the modifying.

Further, in an embodiment, the pricing floor may include a real time pricing floor. Further, the RTPE may be configured for generating the real time pricing floor.

Figure 11:
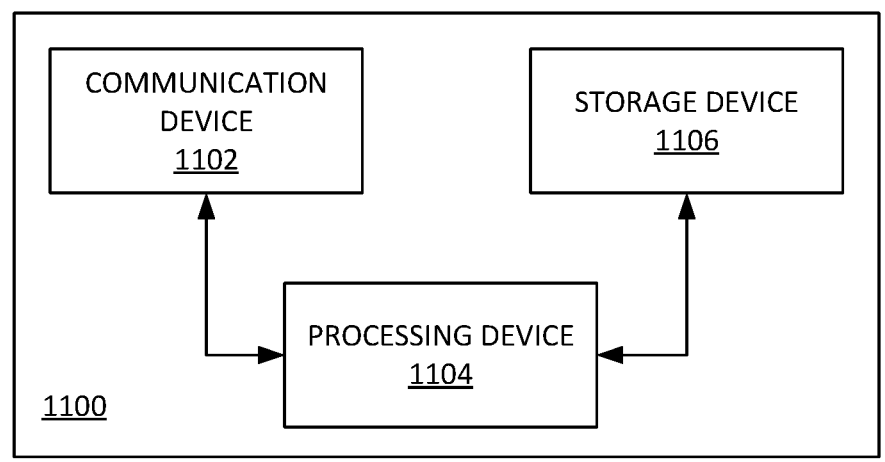
FIG. 11 is a block diagram of a system 1100 for facilitating managing connections of a network, in accordance with some embodiments.

FIG. 11 is a block diagram of a system 1100 for facilitating managing connections of a network, in accordance with some embodiments. Accordingly, the system 1100 may include a communication device 1102, a processing device 1104, and a storage device 1106.

Figure 12:
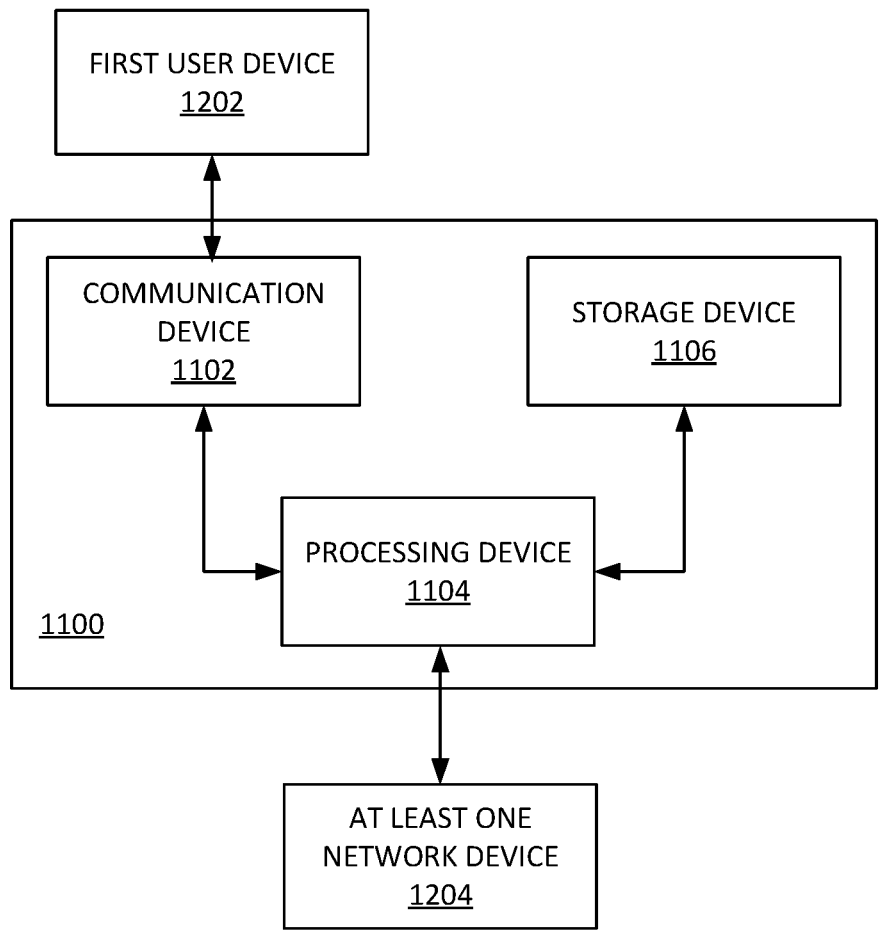
FIG. 12 is a block diagram of the system 1100, in accordance with some embodiments.

Further, the communication device 1102 may be configured for receiving a bidding request from a first user device 1202, as shown in FIG. 12, associated with a first user. Further, the bidding request may include a first bid comprising a first price per data unit for bidding on a connection.

Further, the processing device 1104 may be communicatively coupled with the communication device 1102. Further, the processing device 1104 may be configured for identifying at least one first bid comprising at least one first price per data unit bidden on the connection based on the bidding request. Further, the processing device 1104 may be configured for obtaining at least one information associated with at least one network device 1204, as shown in FIG. 12, of the network used for providing the connection based on the bidding request. Further, the processing device 1104 may be configured for analyzing the at least one information. Further, the processing device 1104 may be configured for determining an availability of a capacity of the at least one network device 1204 for allowing the first user device 1202 to consume data unit using the connection based on the analyzing of the at least one information. Further, the availability may include a positive availability and a negative availability. Further, the processing device 1104 may be configured for analyzing the first bid and the at least one first bid. Further, the processing device 1104 may be configured for determining an outbidding of the at least one first user by the first user based on the analyzing of the first bid and the at least one first bid. Further, the processing device 1104 may be configured for determining an allowance for the connection for the first user based on the positive availability of the capacity and the determining of the outbidding. Further, the processing device 1104 may be configured for configuring the at least one network device 1204 for providing the connection to the first user device 1202 based on the allowance.

Further, the storage device 1106, may be communicatively coupled with the processing device 1104. Further, the storage device 1106 may be configured for storing the first bid.

Further, in some embodiments, the processing device 1104 may be configured for determining at least one requested value of at least one attribute associated with the connection requested by the first user based on the analyzing of the bidding request. Further, the processing device 1104 may be configured for identifying a network device group from at least one network device group associated with the network based on the at least one requested value of the at least one attribute. Further, the network device group may include the at least one network device 1204 for providing the connection with the at least one requested value of the at least one attribute. Further, the obtaining of the at least one information may be based on the identifying of the network device group.

Figure 13:
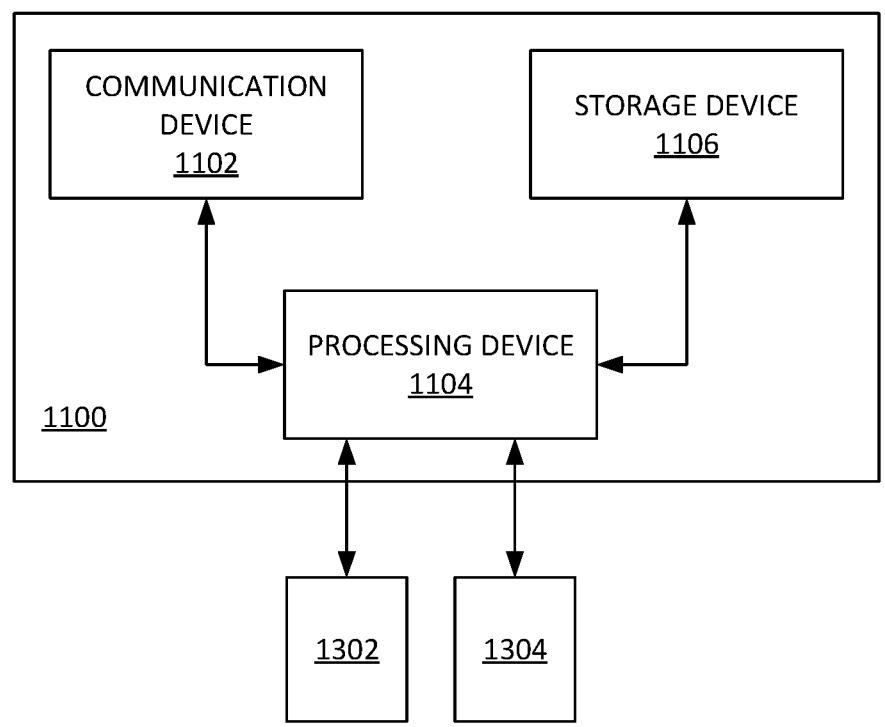
FIG. 13 is a block diagram of the system 1100, in accordance with some embodiments.

Further, in an embodiment, the processing device 1104 may be configured for obtaining a plurality of device information associated with a plurality of network devices 1302-1304, as shown in FIG. 13, of the network. Further, the processing device 1104 may be configured for analyzing the plurality of device information. Further, the processing device 1104 may be configured for determining at least one value of the at least one attribute of the plurality of network devices 1302-1304. Further, the processing device 1104 may be configured grouping the plurality of network devices 1302-1304 based on the at least one value of the at least one attribute. Further, the processing device 1104 may be configured for generating the at least one network device group based on the grouping of the plurality of network devices 1302-1304. Further, the identifying of the network device group from the at least one network device 1204 may be further based on the generating of the at least one network group.

Figure 14:
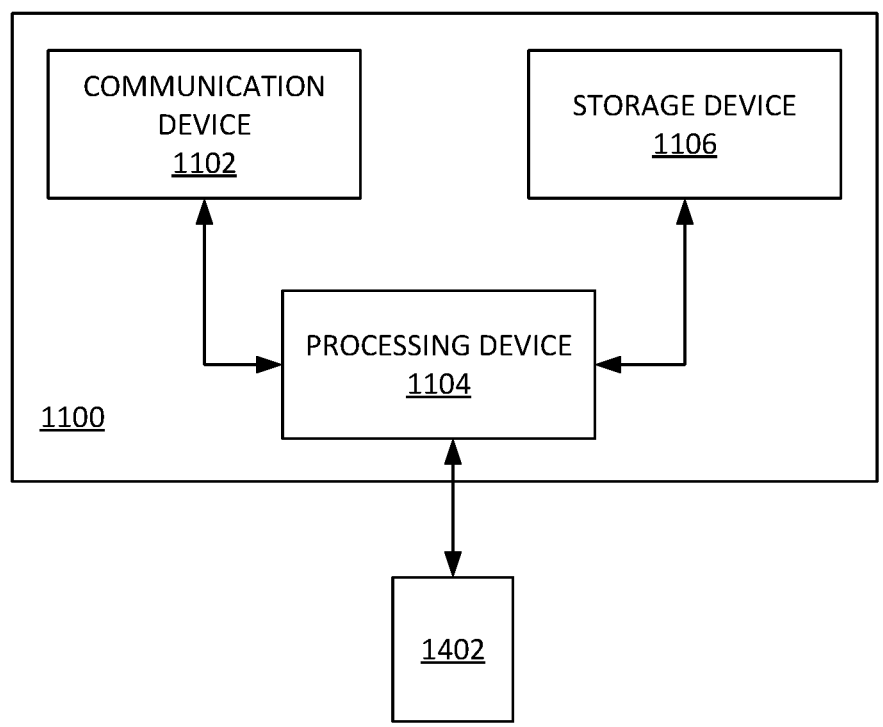
FIG. 14 is a block diagram of the system 1100, in accordance with some embodiments.

Further, in an embodiment, the communication device 1102 may be configured for receiving at least one joining request for incorporating at least one additional network device 1402, as shown in FIG. 14, to the network. Further, the processing device 1104 may be configured for obtaining at least one device information associated with the at least one additional network device 1402 based on the at least one joining request. Further, the processing device 1104 may be configured for analyzing the at least one device information. Further, the processing device 1104 may be configured for grouping the at least one additional network device 1402 based on the at least one additional value of the at least one attribute. Further, the generating of the at least one network device group may be based on the grouping of the at least one additional network device 1402.

Further, in some embodiments, the storage device 1106 may be configured for retrieving at least one second price per data unit corresponding to at least one second bid made by at least one second user for acquiring at least one connection provided by the at least one network device 1204 based on the negative availability of the capacity. Further, the processing device 1106 may be configured for analyzing the at least one second price per data unit corresponding to the at least one second bid and the first price per data unit corresponding to the first bid. Further, the processing device 1106 may be configured for determining a first outbidding of at least one of the at least one second user by the first user based on the analyzing of the at least one second price per data unit and the first price per data unit. Further, the determining of the allowance for the connection for the first user may be based on the first outbidding.

Further, in an embodiment, the storage device 1106 may be configured for retrieving at least one account data associated with at least one second account of at least one of the at least one second user based on the determining of the first outbidding. Further, the processing device 1104 may be configured for analyzing the at least one account data based on at least one criterion for terminating at least one of the at least one connection of at least one of the at least one second user. Further, the processing device 1104 may be configured for determining a fulfillment of the at least one criterion for the terminating. Further, the processing device 1104 may be configured for configuring the at least one network device 1204 for terminating at least one of the at least one connection based on the fulfillment of the at least one criterion. Further, the configuring of the at least one network device 1204 for the providing of the connection to the first user device 1202 may be based on the configuring of the at least one network device 1204 for the terminating of at least one of the at least one connection.

Further, in some embodiments, the storage device 1106 may be configured for retrieving an account data associated with a first account of the first user based on the providing of the connection. Further, the processing device 1104 may be configured for obtaining a first usage information of the connection provided to the first user device 1202 associated with the user. Further, the processing device 1104 may be configured for analyzing the first usage information and the first account data. Further, the processing device 1104 may be configured for determining a fulfillment of at least one first criterion for halting the connection provided to the first user device 1202 based on the analyzing of the first usage information and the first account data. Further, the processing device 1104 may be configured for configuring the at least one network device 1204 for the halting of the connection based on the determining of the fulfillment of the at least one first criterion.

Further, in some embodiments, the storage device 1106 may be configured for retrieving at least one data associated with at least one user associated with the network. Further, the processing device 1104 may be configured for obtaining at least one connection usage information of at least one connection provided to at least one user device associated with the at least one user. Further, the processing device 1104 may be configured for analyzing at least one connection usage information and the at least one account data. Further, the processing device 1104 may be configured for determining a fulfillment of at least one second criterion for initiating the bidding for the network based on the analyzing of the at least one connection usage information and the at least one account data. Further, the processing device 1104 may be configured for initiating a session for the bidding for the at least one connection based on the fulfillment of the at least one criterion. Further, the identifying of the at least one first bid and the obtaining of the at least one information may be further based on the initiation of the session.

Further, in some embodiments, the communication device 1102 may be configured for receiving a request for bidding on the connection from the first user device 1202. Further, the communication device 1102 may be configured for transmitting a pricing floor to the first user device 1202. Further, the storage device 1106 may be configured for retrieving at least one historical bid for at least one historical connection provided by the network based on the request. Further, the processing device 1104 may be configured for analyzing the at least one historical bid. Further, the processing device 1104 may be configured for generating the pricing floor for providing the connection based on the analyzing of the at least one historical bid.

Further, in an embodiment, the analyzing of the at least one historical bid may include analyzing the at least one historical bid using a Real-Time Pricing Engine (RTPE). Further, the RTPE may be configured for tracking a demand of at least one historical value of at least one attribute of the at least one historical connection. Further, the RTPE may be configured for modifying at least one historical pricing floor of the at least one historical connection based on the demand. Further, the generating of the pricing floor may be based on the modifying.

FIG. 12 is a block diagram of the system 1100, in accordance with some embodiments.

FIG. 13 is a block diagram of the system 1100, in accordance with some embodiments.

FIG. 14 is a block diagram of the system 1100, in accordance with some embodiments.

Figure 15:
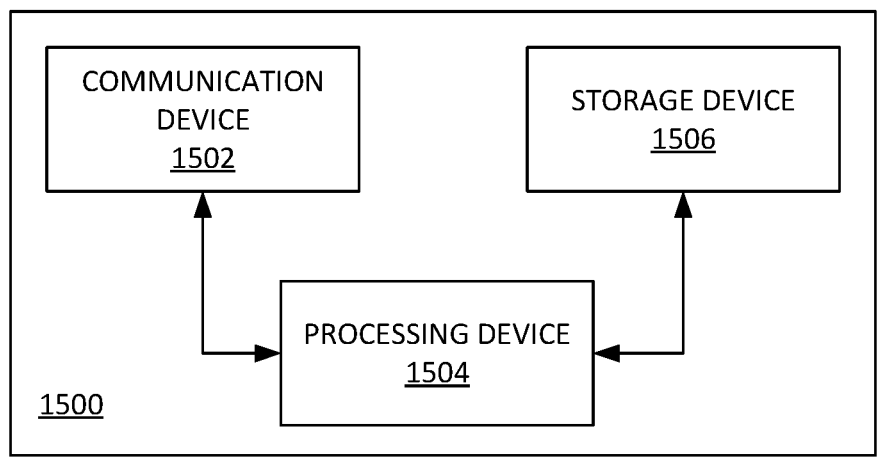
FIG. 15 is a block diagram of a system 1500 for facilitating automated real-time bidding on bandwidth for a plurality of purposes, in accordance with some embodiments.

FIG. 15 is a block diagram of a system 1500 for facilitating automated real-time bidding on bandwidth for a plurality of purposes, in accordance with some embodiments. Accordingly, the system 1500 may include a communication device 1502, a processing device 1504, and a storage device 1506.

Further, the communication device 1502 may be configured for receiving a request from at least one bandwidth seller device associated with at least one bandwidth seller. Further, the at least one bandwidth seller may include an individual, an institution, and an organization that may want to join a Proxidize proxy network and provide internet. Further, the at least one bandwidth seller device may include any network connected device. Further, in an instance, the at least one bandwidth seller device may include USB modems, phones, laptops, IoT devices, virtual servers, cloud servers, etc. Further, the request may include bandwidth attributes associated with the bandwidth provided by the at least one bandwidth seller device. Further, the bandwidth attributes may include speed, location, ASN, ISP, IP subnet, and so on. Further, the communication device 1502 may be configured for receiving a connection request from at least one bandwidth buyer device associated with at least one bandwidth buyer. Further, the at least one bandwidth buyer may include an individual, an institution, and an organization that may want to join a Proxidize proxy network to buy the bandwidth for accessing the internet. Further, the at least one bandwidth buyer device may include USB modems, smartphones, mobile phones, laptops, desktops, IoT devices, virtual servers, cloud servers, etc. Further, the connection request may include at least one buyer bandwidth attribute associated with a desired bandwidth that the at least one bandwidth buyer may want to buy. Further, the at least one buyer bandwidth attribute may include speed, location, ASN, ISP, IP subnet, and so on. Further, the connection request may include a bid corresponding to the at least one buyer bandwidth attribute. Further, the bid may include an amount that the at least one bandwidth buyer may want to pay for consuming the bandwidth. Further, in an instance, the bid may be an amount wish to pay per 1 MB/10 MB/100 MB/1 GB of bandwidth that at least one bandwidth buyer consumes via the proxies. For this example, the at least one bandwidth buyer may set the amount at $0.01/MB. Further, the communication device 1502 may be configured for establishing a communication channel based on the allocating. Further, the communication channel may allow the at least one bandwidth buyer to consume the desired bandwidth.

Further, the processing device 1504 may be communicatively coupled with the communication device 1502. Further, the processing device 1504 may be configured for grouping the bandwidth attributes provided by the at least one bandwidth seller. Further, the processing device 1504 may be configured for generating a plurality of groups associated with the bandwidth attributes based on the grouping. Further, the processing device 1504 may be configured for identifying a buyer group of the plurality of groups associated with the at least one bandwidth buyer attribute. Further, the processing device 1504 may be configured for analyzing the connection request, a plurality of bids, and bandwidth allocating criteria. Further, the processing device 1504 may be configured for allocating the desired bandwidth to the at least one bandwidth buyer based on the analyzing.

Further, the storage device 1506 may be communicatively coupled with the processing device 1504. Further, the storage device 1506 may be configured for retrieving the bandwidth allocating criteria and plurality of bids associated with the buyer group. Further, the plurality of bids may include bids by the plurality of bandwidth buyers that exist in the buyer group. Further, the storage device 1506 may be configured for storing the connection request and the request in a distributed ledger.

Figure 16:
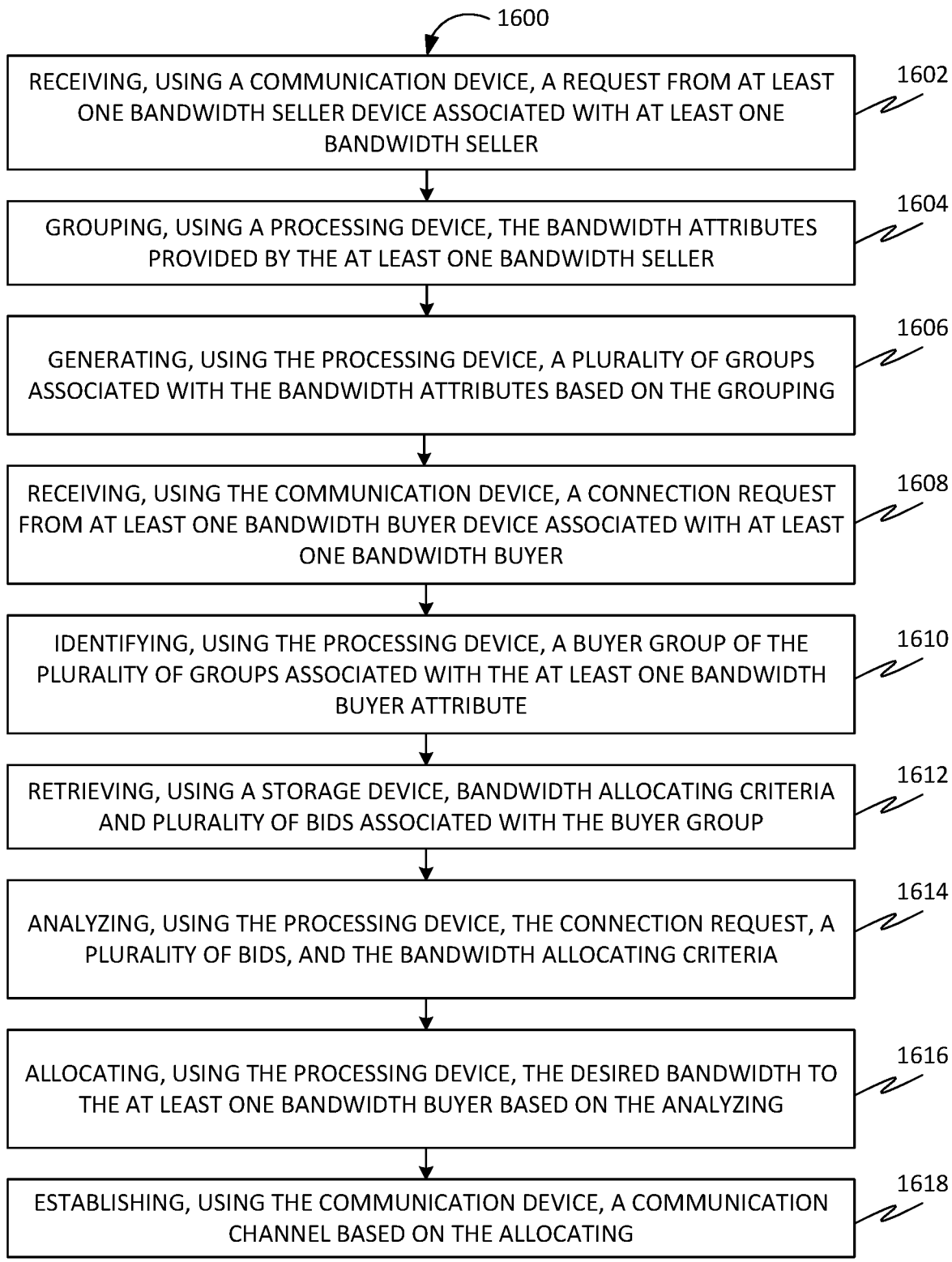
FIG. 16 is a flowchart of a method 1600 for facilitating automated real-time bidding on bandwidth for a plurality of purposes, in accordance with some embodiments.

FIG. 16 is a flowchart of a method 1600 for facilitating automated real-time bidding on bandwidth for a plurality of purposes, in accordance with some embodiments. Accordingly, at 1602, the method 1600 may include receiving, using a communication device, a request from at least one bandwidth seller device associated with at least one bandwidth seller. Further, the at least one bandwidth seller may include an individual, an institution, and an organization that may want to join a Proxidize proxy network and provide internet. Further, the at least one bandwidth seller device may include any network connected device. Further, in an instance, the at least one bandwidth seller device may include USB modems, phones, laptops, IoT devices, virtual servers, cloud servers, etc. Further, the request may include bandwidth attributes associated with the bandwidth provided by the at least one bandwidth seller device. Further, the bandwidth attributes may include speed, location, ASN, ISP, IP subnet, and so on.

Further, at 1604, the method 1600 may include grouping, using a processing device, the bandwidth attributes provided by the at least one bandwidth seller. Further, the bandwidth attributes may include parameters such as but not limited to speed, operating system of device, and location.

Further, at 1606, the method 1600 may include generating, using the processing device, a plurality of groups associated with the bandwidth attributes based on the grouping. Further, the plurality of groups may include for example, devices with more than 100 Mbps speed, devices running on Verizon ISP, and devices with IP 192.185.00.

Further, at 1608, the method 1600 may include receiving, using the communication device, a connection request from at least one bandwidth buyer device associated with at least one bandwidth buyer. Further, the at least one bandwidth buyer may include an individual, an institution, and an organization that may want to join a Proxidize proxy network to buy the bandwidth for accessing the internet. Further, the at least one bandwidth buyer device may include USB modems, smartphones, mobile phones, laptops, desktops, IoT devices, virtual servers, cloud servers, etc. Further, the least one bandwidth buyer device may choose to bid on devices with specific cellular network and network-fetching capabilities such as Cellular Frequency or Bands, PLMN, RSSI, RSRP, SINR, and other mobile-specific characteristics. Further, the connection request may include at least one buyer bandwidth attribute associated with a desired bandwidth that the at least one bandwidth buyer may want to buy. Further, the at least one buyer bandwidth attribute may include speed, location, ASN, ISP, IP subnet, and so on. Further, the connection request may include a bid corresponding to the at least one buyer bandwidth attribute. Further, the bid may include an amount that the at least one bandwidth buyer may want to pay for consuming the bandwidth. Further, in an instance, the bid may be an amount wish to pay per 1 MB/10 MB/100 MB/1 GB of bandwidth that at least one bandwidth buyer consumes via the proxies. For this example, the at least one bandwidth buyer may set the amount at $0.01/MB.

Further, at 1610, the method 1600 may include identifying, using the processing device, a buyer group of the plurality of groups associated with the at least one bandwidth buyer attribute.

Further, at 1612, the method 1600 may include retrieving, using a storage device, bandwidth allocating criteria and plurality of bids associated with the buyer group. Further, the plurality of bids may include bids by the plurality of bandwidth buyers that exist in the buyer group.

Further, at 1614, the method 1600 may include analyzing, using the processing device, the connection request, a plurality of bids, and the bandwidth allocating criteria.

Further, at 1616, the method 1600 may include allocating, using the processing device, the desired bandwidth to the at least one bandwidth buyer based on the analyzing.

Further, at 1618, the method 1600 may include establishing, using the communication device, a communication channel based on the allocating. Further, the communication channel may allow the at least one bandwidth buyer to consume the desired bandwidth using the Proxidize proxy network.

Further, at 1618, the method 1600 may include storing, using the storage device, the connection request and the request in a distributed ledger.

Further, in some embodiments, the analyzing may include comparing the plurality of bids and bid corresponding to the buyer group. Further, the method 1600 may include determining, using the processing device, a group capacity of the buyer group based on the comparing. Further, the allocating of the desired bandwidth may be based on the group capacity.

Further, in some embodiments, the method 1600 may include retrieving, using the storage device, account balance information associated with an account of the at least one bandwidth buyer. Further, the method 1600 may include comparing, using the processing device, the bid and the account balance information. Further, the method 1600 may include generating, using the processing device, a top-up alert based on the comparing. Further, the top-up alert may indicate that the account balance is less than the bid. Further, the method 1600 may include transmitting, using the communication device, the top-up alert to the at least one bandwidth buyer device.

Further, in some embodiments, the method 1600 may include receiving, using the communication device, a payment information from the at least one bandwidth buyer device. Further, the payment information may include a top-up amount that the at least one bandwidth buyer may want to add to the account balance and payment mode details such as credit card details, UPI address, debit card details, etc. Further, the method 1600 may include processing, using the processing device, a transaction based on the payment information. Further, the method 1600 may include adding, using the processing device, the top-up amount to the account balance based on the processing of the transaction. Further, the method 1600 may include storing, using the storage device, the top-up amount, the payment information, and the top-up alert in the distributed ledger.

Figure 17:
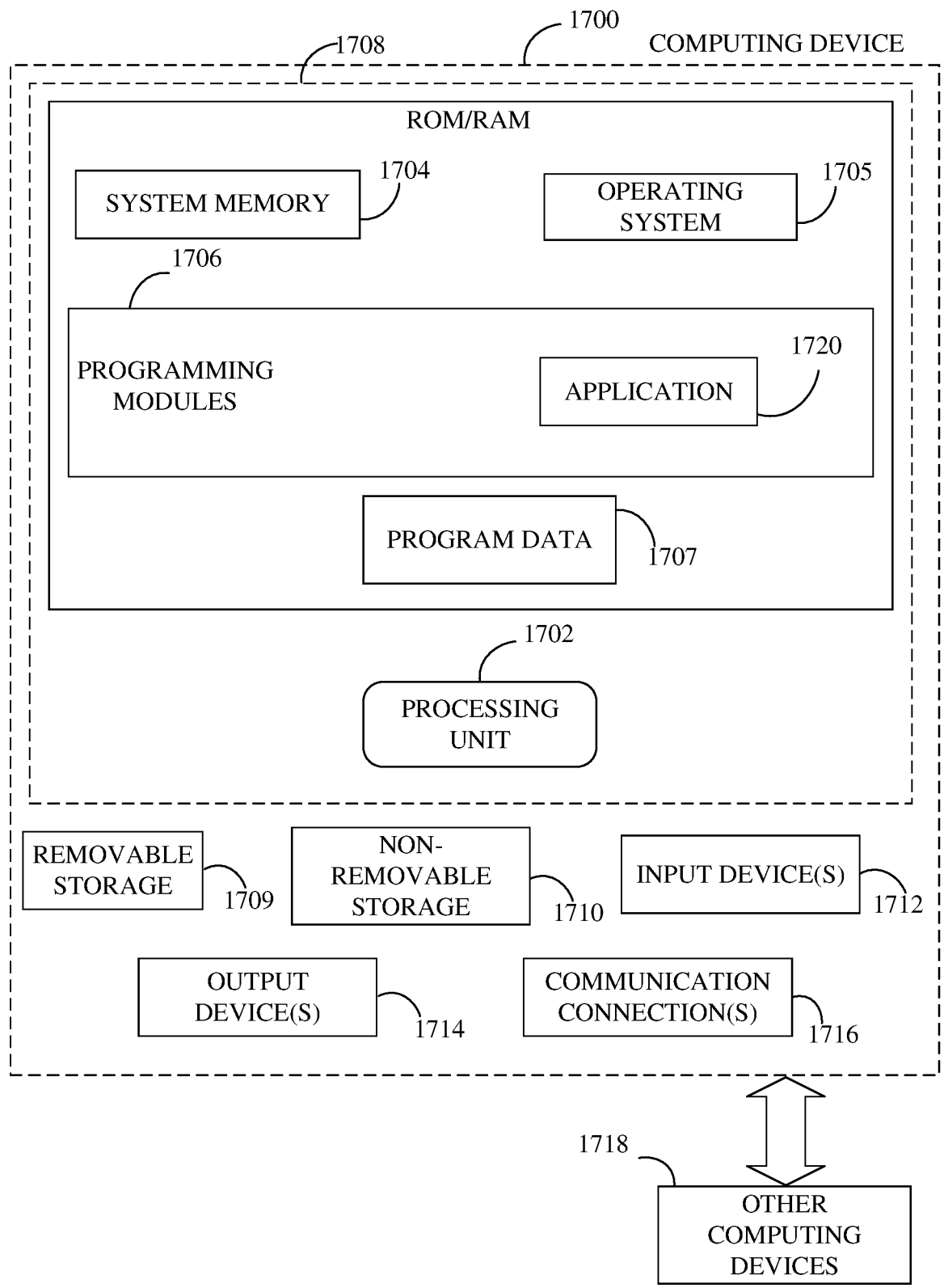
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700 operation. In one embodiment, programming modules 1706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1704, including operating system 1705. While executing on processing unit 1702, programming modules 1706 (e.g., application 1720) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like.

Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating managing connections of a network, the method comprising:
   receiving, using a communication device, a bidding request from a first user device associated with a first user, wherein the bidding request comprises a first bid comprising a first price per data unit for bidding on a connection;
   identifying, using a processing device, at least one first bid comprising at least one first price per data unit bidden on the connection based on the bidding request;
   obtaining, using the processing device, at least one information associated with at least one network device of the network used for providing the connection based on the bidding request;
   analyzing, using the processing device, the at least one information;
   determining, using the processing device, an availability of a capacity of the at least one network device for allowing the first user device to consume data unit using the connection based on the analyzing of the at least one information, wherein the availability comprises a positive availability and a negative availability;
   analyzing, using the processing device, the first bid and the at least one first bid;
   determining, using the processing device, an outbidding of the at least one first user by the first user based on the analyzing of the first bid and the at least one first bid;
   determining, using the processing device, an allowance for the connection for the first user based on the positive availability of the capacity and the determining of the outbidding;
   configuring, using the processing device, the at least one network device for providing the connection to the first user device based on the allowance; and
   storing, using a storage device, the first bid.

2. The method of claim 1 further comprising:
   determining, using the processing device, at least one requested value of at least one attribute associated with the connection requested by the first user based on the analyzing of the bidding request; and
   identifying, using the processing device, a network device group from at least one network device group associated with the network based on the at least one requested value of the at least one attribute, wherein the network device group comprises the at least one network device for providing the connection with the at least one requested value of the at least one attribute, wherein the obtaining of the at least one information is further based on the identifying of the network device group.

3. The method of claim 2 further comprising;
obtaining, using the processing device, a plurality of device information associated with a plurality of network devices of the network;
analyzing, using the processing device, the plurality of device information;
determining, using the processing device, at least one value of the at least one attribute of the plurality of network devices;
grouping, using the processing device, the plurality of network devices based on the at least one value of the at least one attribute; and
generating, using the processing device, the at least one network device group based on the grouping of the plurality of network devices, wherein the identifying of the network device group from the at least one network device is further based on the generating of the at least one network group.

4. The method of claim 3 further comprising:
receiving, using the communication device, at least one joining request for incorporating at least one additional network device to the network;
obtaining, using the processing device, at least one device information associated with the at least one additional network device based on the at least one joining request;
analyzing, using the processing device, the at least one device information;
determining, using the processing device, at least one additional value of the at least one attribute based on the analyzing of the at least one device information; and
grouping, using the processing device, the at least one additional network device based on the at least one additional value of the at least one attribute, wherein the generating of the at least one network device group is further based on the grouping of the at least one additional network device.

5. The method of claim 1 further comprising:
retrieving, using the storage device, at least one second price per data unit corresponding to at least one second bid made by at least one second user for acquiring at least one connection provided by the at least one network device based on the negative availability of the capacity;
analyzing, using the processing device, the at least one second price per data unit corresponding to the at least one second bid and the first price per data unit corresponding to the first bid; and
determining, using the processing device, a first outbidding of at least one of the at least one second user by the first user based on the analyzing of the at least one second price per data unit and the first price per data unit, wherein the determining of the allowance for the connection for the first user is further based on the first outbidding.

6. The method of claim 5 further comprising:
retrieving, using the storage device, at least one account data associated with at least one second account of at least one of the at least one second user based on the determining of the first outbidding;
analyzing, using the processing device, the at least one account data based on at least one criterion for terminating at least one of the at least one connection of at least one of the at least one second user;
determining, using the processing device, a fulfillment of the at least one criterion for the terminating; and
configuring, using the processing device, the at least one network device for terminating at least one of the at least one connection based on the fulfillment of the at least one criterion, wherein the configuring of the at least one network device for the providing of the connection to the first user device is further based on the configuring of the at least one network device for the terminating of at least one of the at least one connection.

7. The method of claim 1 further comprising:
retrieving, using the storage device, an account data associated with a first account of the first user based on the providing of the connection;
obtaining, using the processing device, a first usage information of the connection provided to the first user device associated with the user;
analyzing, using the processing device, the first usage information and the first account data;
determining, using the processing device, a fulfillment of at least one first criterion for halting the connection provided to the first user device based on the analyzing of the first usage information and the first account data; and
configuring, using the processing device, the at least one network device for the halting of the connection based on the determining of the fulfillment of the at least one first criterion.

8. The method of claim 1 further comprising:
retrieving, using the storage device, at least one data associated with at least one user associated with the network;
obtaining, using the processing device, at least one connection usage information of at least one connection provided to at least one user device associated with the at least one user;
analyzing, using the processing device, at least one connection usage information and the at least one account data;
determining, using the processing device, a fulfillment of at least one second criterion for initiating the bidding for the network based on the analyzing of the at least one connection usage information and the at least one account data; and
initiating, using the processing device, a session for the bidding for the at least one connection based on the fulfillment of the at least one criterion, wherein the identifying of the at least one first bid and the obtaining of the at least one information is further based on the initiating of the session.

9. The method of claim 1 further comprising:
receiving, using the communication device, a request for bidding on the connection from the first user device;
retrieving, using the storage device, at least one historical bid for at least one historical connection provided by the network based on the request;
analyzing, using the processing device, the at least one historical bid;
generating, using the processing device, a pricing floor for providing the connection based on the analyzing of the at least one historical bid; and
transmitting, using the communication device, the pricing floor to the first user device.

10. The method of claim 9, wherein the analyzing of the at least one historical bid further comprises analyzing the at least one historical bid using a Real-Time Pricing Engine (RTPE), wherein the RTPE is configured for:
- tracking a demand of at least one historical value of at least one attribute of the at least one historical connection; and
- modifying at least one historical pricing floor of the at least one historical connection based on the demand, wherein the generating of the pricing floor is further based on the modifying.

11. A system for facilitating managing connections of a network, the system comprising:
- a communication device configured for receiving a bidding request from a first user device associated with a first user, wherein the bidding request comprises a first bid comprising a first price per data unit for bidding on a connection;
- a processing device communicatively coupled with the communication device, wherein the processing device is configured for:
  - identifying at least one first bid comprising at least one first price per data unit bidden on the connection based on the bidding request;
  - obtaining at least one information associated with at least one network device of the network used for providing the connection based on the bidding request;
  - analyzing the at least one information;
  - determining an availability of a capacity of the at least one network device for allowing the first user device to consume data unit using the connection based on the analyzing of the at least one information, wherein the availability comprises a positive availability and a negative availability;
  - analyzing the first bid and the at least one first bid;
  - determining an outbidding of the at least one first user by the first user based on the analyzing of the first bid and the at least one first bid;
  - determining an allowance for the connection for the first user based on the positive availability of the capacity and the determining of the outbidding; and
  - configuring the at least one network device for providing the connection to the first user device based on the allowance; and
- a storage device communicatively coupled with the processing device, wherein the storage device is configured for storing the first bid.

12. The system of claim 11, wherein the processing device is further configured for:
- determining at least one requested value of at least one attribute associated with the connection requested by the first user based on the analyzing of the bidding request; and
- identifying a network device group from at least one network device group associated with the network based on the at least one requested value of the at least one attribute, wherein the network device group comprises the at least one network device for providing the connection with the at least one requested value of the at least one attribute, wherein the obtaining of the at least one information is further based on the identifying of the network device group.

13. The system of claim 12, wherein the processing device is further configured for:
- obtaining a plurality of device information associated with a plurality of network devices of the network;
- analyzing the plurality of device information;
- determining at least one value of the at least one attribute of the plurality of network devices;
- grouping the plurality of network devices based on the at least one value of the at least one attribute; and
- generating the at least one network device group based on the grouping of the plurality of network devices, wherein the identifying of the network device group from the at least one network device is further based on the generating of the at least one network group.

14. The system of claim 13, wherein the communication device is further configured for receiving at least one joining request for incorporating at least one additional network device to the network, wherein the processing device is further configured for:
- obtaining at least one device information associated with the at least one additional network device based on the at least one joining request;
- analyzing the at least one device information;
- determining at least one additional value of the at least one attribute based on the analyzing of the at least one device information; and
- grouping the at least one additional network device based on the at least one additional value of the at least one attribute, wherein the generating of the at least one network device group is further based on the grouping of the at least one additional network device.

15. The system of claim 11, wherein the storage device is further configured for retrieving at least one second price per data unit corresponding to at least one second bid made by at least one second user for acquiring at least one connection provided by the at least one network device based on the negative availability of the capacity, wherein the processing device is further configured for:
- analyzing the at least one second price per data unit corresponding to the at least one second bid and the first price per data unit corresponding to the first bid; and
- determining a first outbidding of at least one of the at least one second user by the first user based on the analyzing of the at least one second price per data unit and the first price per data unit, wherein the determining of the allowance for the connection for the first user is further based on the first outbidding.

16. The system of claim 15, wherein the storage device is further configured for retrieving at least one account data associated with at least one second account of at least one of the at least one second user based on the determining of the first outbidding, wherein the processing device is further configured for:
- analyzing the at least one account data based on at least one criterion for terminating at least one of the at least one connection of at least one of the at least one second user;
- determining a fulfillment of the at least one criterion for the terminating; and
- configuring the at least one network device for terminating at least one of the at least one connection based on the fulfillment of the at least one criterion, wherein the configuring of the at least one network device for the providing of the connection to the first user device is further based on the configuring of the at least one network device for the terminating of at least one of the at least one connection.

17. The system of claim 11, wherein the storage device is further configured for retrieving an account data associated with a first account of the first user based on the providing of the connection, wherein the processing device is further configured for:
- obtaining a first usage information of the connection provided to the first user device associated with the user;
- analyzing the first usage information and the first account data;
- determining a fulfillment of at least one first criterion for halting the connection provided to the first user device based on the analyzing of the first usage information and the first account data; and
- configuring the at least one network device for the halting of the connection based on the determining of the fulfillment of the at least one first criterion.

18. The system of claim 11, wherein the storage device is further configured for retrieving at least one data associated with at least one user associated with the network, wherein the processing device is further configured for:
- obtaining at least one connection usage information of at least one connection provided to at least one user device associated with the at least one user;
- analyzing at least one connection usage information and the at least one account data;
- determining a fulfillment of at least one second criterion for initiating the bidding for the network based on the analyzing of the at least one connection usage information and the at least one account data; and
- initiating a session for the bidding for the at least one connection based on the fulfillment of the at least one criterion, wherein the identifying of the at least one first bid and the obtaining of the at least one information is further based on the initiating of the session.

19. The system of claim 11, wherein the communication device is further configured for:
- receiving a request for bidding on the connection from the first user device; and
- transmitting a pricing floor to the first user device, wherein the storage device is further configured for retrieving at least one historical bid for at least one historical connection provided by the network based on the request, wherein the processing device is further configured for:
- analyzing the at least one historical bid; and
- generating the pricing floor for providing the connection based on the analyzing of the at least one historical bid.

20. The system of claim 19, wherein the analyzing of the at least one historical bid further comprises analyzing the at least one historical bid using a Real-Time Pricing Engine (RTPE), wherein the RTPE is configured for:
- tracking a demand of at least one historical value of at least one attribute of the at least one historical connection; and
- modifying at least one historical pricing floor of the at least one historical connection based on the demand, wherein the generating of the pricing floor is further based on the modifying.

* * * * *